United States Patent

Smith et al.

[15] 3,704,346

[45] Nov. 28, 1972

[54] TELEPHONE SWITCHING AND FORWARDING SYSTEM

[72] Inventors: Lloyd M. Smith, Canoga Park; James B. Scott, Tarzana; William H. Wertz, Newberry Park, all of Calif.

[73] Assignee: Commatic Systems, Chatsworth, Calif.

[22] Filed: Jan. 28, 1970

[21] Appl. No.: 6,487

[52] U.S. Cl. ..........................179/18 BE, 179/18 BA

[51] Int. Cl. ..........................................H04m 3/54

[58] Field of Search ..179/18 BA, 18 BE, 18 BD, 5 P, 179/84 L, 84 R

[56] References Cited

UNITED STATES PATENTS

| | | | |
|---|---|---|---|
| 3,469,036 | 9/1969 | Meri | 179/84 L |
| 3,406,262 | 10/1968 | Grandstaff | 179/84 R |
| 3,409,741 | 11/1968 | Odom | 179/18 BE |
| 3,484,561 | 12/1969 | Matthews | 179/2 A |
| 3,573,389 | 4/1971 | Greenstein et al. | 179/18 BE |
| 3,427,402 | 2/1969 | Stokes | 179/5 P |
| 3,334,190 | 8/1967 | Jenkins et al. | 179/18 BA |
| 3,363,063 | 1/1968 | Kandel et al. | 179/18 BE |
| 3,531,597 | 9/1970 | Andrews et al. | 179/5 P |
| 3,072,746 | 1/1963 | Zimmermann | 179/5 P |

*Primary Examiner*—Kathleen H. Claffy
*Assistant Examiner*—David L. Stewart
*Attorney*—Smyth, Roston & Pavitt

[57] ABSTRACT

Described herein is a call diversion system for receiving a telephone call, dialing out a different number through a second line and linking the two lines. When identification is needed, an identification code is likewise transmitted subsequent to dial-out. A conversation monitor detects absence of communication to permit a timer to run for testing whether temporary interruption of a line evokes dial tone to reset the system. The number to be dialed out can be reprogrammed locally or remotely by sending signals into the system. The number to be dialed out is held in a memory having, for example, individually addressable locations. Automatic dial-out proceeds by a counting process for accurately timing dial pulses and pauses. During operation memory address sequences alternate with dial tone search phases. A subscriber can initiate an immediate dial-out from a remote location. The system diverts calls immediately in the operate mode but defers diversion in the standby mode, giving the user opportunity to answer the phone directly.

36 Claims, 11 Drawing Figures

INVENTORS:
Lloyd M. Smith
James B. Scott
William H. Wertz

By [signature]
ATTORNEYS

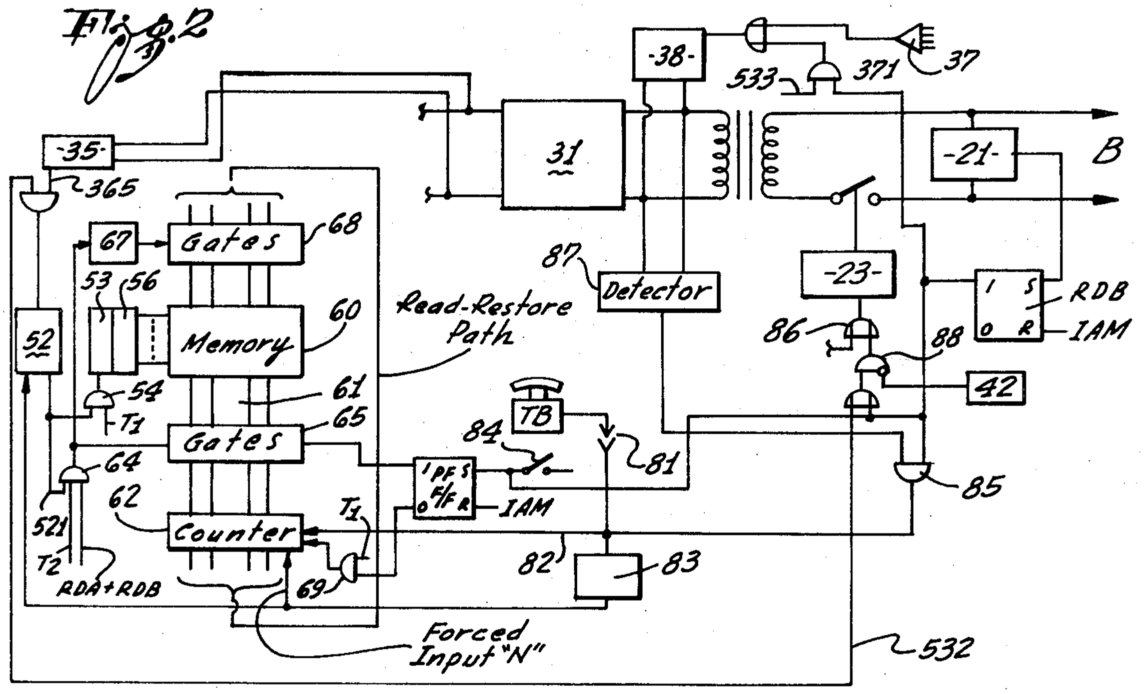
Fig. 7
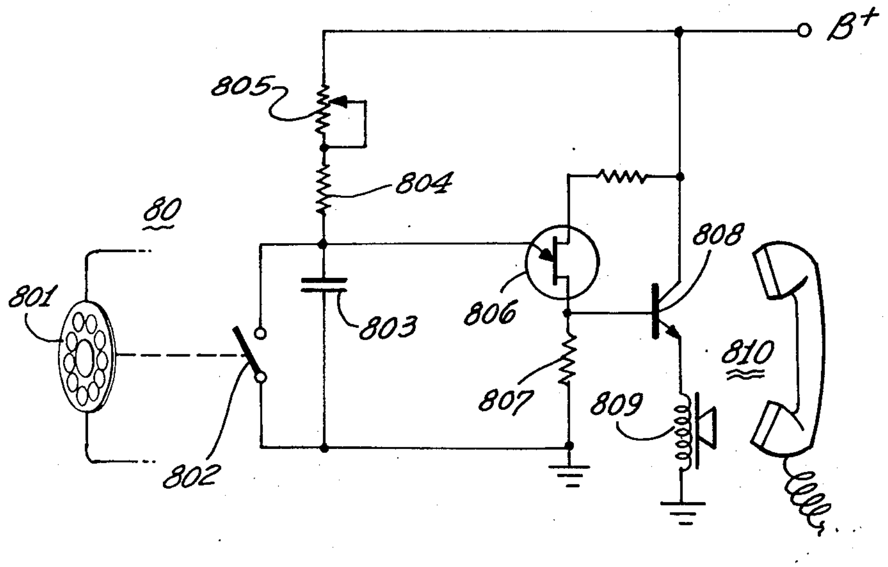
INVENTORS:
Lloyd M. Smith
James B. Scott
William H. Wertz
By Smyth, Roston & Pavitt
ATTORNEYS INVENTORS:
Lloyd M. Smith
James B. Scott
William H. Wertz By Smyth, Roston & Pavitt
ATTORNEYS INVENTORS:
Lloyd M. Smith
James B. Scott
William H. Wertz
By Smyth, Roston & Pavitt
ATTORNEYS INVENTORS
Lloyd M. Smith
James B. Scott
William H. Wertz
By Smyth, Roston & Pavitt
ATTORNEYS INVENTORS
Lloyd M. Smith
James B. Scott
William H. Wertz By Smyth, Roston & Pavitt
ATTORNEYS

TELEPHONE SWITCHING AND FORWARDING SYSTEM

The present invention relates to a system for transfering and switching a phone call, having arrived at a subscriber's telephone line, by forwarding the call to a different location and particularly through a telephone line outlet having a different telephone number. Call transfer and switching devices including those of the invention essentially require two local but separate subscriber telephone lines. A call coming in through one line is switched through to the other line so that the two lines are interconnected. The interconnection is preceded by an automatic dial-out of the number to which the call is to be transferred through the other line.

Call transfer and switching of this type has been suggested in the past but the known equipment is extensive, cumbersome to operate, and, therefore, quite expensive. The difficulties arising from attempted employment of such a call diverter stem primarily from the fact that the telephone system throughout the nation is not uniform. Certain features are standardized, many are not. A call transferring and switching device, however, to be successfully used, must be designed to be substantially independent from such local differences. These differences relate, for example, to timing in general, signal level, noise level, ringing and dial tone frequencies, periods of sustained providing of a dial tone and others.

On the other hand, call switching and forwarding may well be practiced in different environments. That is to say that usage is likewise not uniform. Hence, such a system should be designed to cover broadly large differences in conditions under which it may have to operate, while, on the other hand, economics dictate adaptation to specific uses without requiring a single unit to exhibit universality for all cases. The telephone call transferring and switching system in accordance with the present invention can be regarded as including several central elements or building blocks to which are added optional features of a supplementing nature, for establishing specific uses or enlarging the scope of utilization. Certain modifications permit simplification for economic reasons and establish call transferring and switching systems of particular limited use, without introducing change in overall operation.

Call transferring and switching devices can be regarded as falling into different classes of usage, such differences bearing on design and degree of sophistication. In a first class of usage, a call transferring and switching device transfers an incoming call to a different number which may vary from time to time. For example, the subscriber having such a unit in his office or at home may wish to be reached in different locations at different times. Within this class, subclasses can be defined relating to the ease and extent of reprogramming the unit for changing the number to which a call is transferred.

A second class of usage permits the establishing of an improved kind of answering service. Here the call transferring unit is destined to forward a call always to an answering service, or more generally, to a fixed telephone number of a place where always somebody is available to answer the call. Thus, the term "answering service" should be understood in a general sense. For example, if a doctor is always either at home or in the hospital, he will install such a transferring unit in his home, and any incoming calls will automatically be switched to the hospital serving in this case as an "answering service." It is readily apparent that to some extent a call transfer and switching unit of class one can be used also in an environment of class two, but answering service systems may include special features directed to that particular type of use, not needed for other types of call transfer.

A different line of usage overlapping to some extent the type made above, and being relevant particularly for the present invention is as follows.

In one class, the user wishes from time to time to transmit different telephone numbers to his unit in home or office, to be stored therein so that other calls reaching the unit at home or office thereafter will be transferred to the number transmitted last. In another class the user wishes to phone his unit at home or office and then transmit a number to be dialed out immediately by the unit at that time, and his call is switched immediately to the new number. This will be desirable if the user wishes to make a long distance call from outside his office, but can phone his own unit by local call. This way he does not bother the subscriber whose phone he uses with long distance charges, or he may readily use a pay phone with only nominal direct charges at the time of the call.

The system in accordance with the invention is constructed to permit easy adaptation to different usage of this type. The invention thus relates to a family of call transfer and switching types, with each type differing from at least one other type in some aspects only while maintaining the same mode of operation of, among and with the common features, the difference relating essentially to addition, omission or modification, which do not change the principal operation with or of the remaining or unmodified parts.

The system in accordance with the present invention has the following features whereby particularly those features which are common to most variations will be discussed first. The subscriber is presumed to have two telephone lines, one being a line under which he is listed and through which he can normally be reached. The second line should preferably be an unlisted number known only to him. The object is to divert a call coming in through the listed line by dialing out a number automatically through the unlisted line and to establish subsequently a direct link between the two lines. For reasons of convenience, the line through which calls normally come in will, in the following, be called "line A." The line through which calls are automatically transferred out is in the following called "line B."

The unit includes a ring detector responding to the ringing signal coming in through Line A and covering a wide range of frequencies and types of ringing signals. The ring detector is designed for common mode rejection, as well as for response to a minimum number of waves of low or medium frequency, particularly to cut off dial pulse sequences which have lower energy content and about 10 cps and which never cover more than ten pulses. The ring detector when responding to a ringing signal closes the circuit to line B, and a particular dial tone detector monitors the presence of a dial tone.

The dial tone detector monitors the signals in the audio frequency range and responds to persistence of the envelope above a particular level to distinguish between noise, on one hand, and conversation and dial tone in a line, on the other hand. The dial tone detector includes as a component a timing circuit which responds to presence or absence of a persisting information signal in whatever line it is connected, the persistence to last for a predetermined period of time, to distinguish dial tone from other signals on that basis.

As dial tone in line B is detected in that manner, readout of a storage facility begins. For example, an address counter is operated to sequentially address locations of a digital memory holding manifestations of numbers representing digits to be dialed out as the telephone number to which the incoming call is to be transferred.

For operating the system for variable number dial-out and call transfer, the memory must be designed so that a new number can be recorded or set when desired while the previous recording is eliminated so that the number to which a call can be transferred can vary indeed. For operation in an answering service system, the memory can be of the ready-only type. Both classes of uses along the first line of division expounded above can be readily accomodated by a memory with manually settable switches defining the numbers to be stored.

The number held in memory is dialed out through the line B, and upon completion of dial-out a line A switch is closed which actually "answers" the call that came in on line A. The two lines are now coupled through a coupling section keeping the two lines electrically isolated from each other as far as d.c. electrical potentials is concerned, but the coupling section transmits audio signals between the two lines. Thus, after the caller has dialed, he first hears ringing which is ringing in line A; after the unit has completed its dial-out, the caller still hears ringing but now from the outgoing line B as coupled to line A.

The coupling section preferably includes a bidirectionally operating repeater amplifier. A signal level boost may be desirable because the call is now routed twice through the central telephone exchange, and there may or may not be amplification, as not all exchanges amplify all calls.

As soon as the lines are linked, the tone detector monitors the signal amplitude level in the circuit defining the transmission path between lines A and B. If there is a conversational lull or if the conversation has been terminated or if the caller has hung up prior to the dialed out number having been answered, i.e., if there is absence of any information signals passing through the linking circuit for a particular period of time, a timing operation begins to temporarily open the connection in line A.

Temporary interruption of line A will evoke a dial tone after reclosing if, in fact, the caller on line A has hung up. If not, the temporary interruption will not permanently interrupt the communication line. The timer will be reset whenever there is conversation or when the conversation is resumed so that the temporary interruption does not take place. Thus, the attempt to evoke a dial tone by temporarily interrupting line A does not take place when communication signals pass through the linking systems. This is particularly important as the telephone lines are more and more used for data transmission. When dial tone has been evoked in that manner, the link is interrupted and the entire unit resets.

The dial-out operation proceeds preferably as a counting operation. A number read from a memory location in representation of a decimal digit of the stored telephone number is counted up or down until a particular, fixed number is reached. The counting is carried out at the precise rate needed for pulsating dial-out. The number of pulses sent out equals the number of counting steps. Each such pulse has definite duration, for example, two-thirtieths of a second and is preceded and followed respectively by a pause of one-thirtieth of a second each. Subsequently, counting may still proceed until another counter number has been reached, (for example, recycling of the counter), while dial pulses are not produced. This way a pause between two dial pulse sequences (each representing a different digit) is metered at a high degree of accuracy.

When used in cooperation with an answering service and prior to linking the two lines, the dial-out operation can be succeeded by providing, additionally, a pulse code pattern into line B. Signals representing the pulse code pattern are likewise stored in memory, but instead of dial-out, a pulse modulated carrier is transmitted through the closed line B, by operation of a similar counting procedure as mentioned in the preceding paragraph. The pulse code pattern uniquely identifies the subscriber and is decoded in equipment of the answering service to provide an indication as to the identify of the subscriber from whose unit a call is just about to be transferred.

A call transfer and switching unit with variable memory can be operated selectively in cooperation with an external answering service or for variable dial-out. It is merely up to the subscriber to store in memory the number of the answering service or any other number to which he wants calls to be transferred.

In accordance with the other line of division, and in accordance with an additional feature of the invention, the memory can be designed for reprogramming, i.e., changing of the content of memory from a remote location. This requires a memory, the content of which can be changed through electrical signals.

For reprogramming the subscriber dials from a remote location, preferably his line B number, and the system or unit is designed so that dialing-in, through line B, shifts the system into the reprogramming mode. After having established communication with his unit in this manner from a remote location, the subscriber transmits a series of signals into the receiver or line he uses. The signals represent the new number to be stored in the memory of his unit and to which subsequently incoming calls through line A are to be transferred.

These signals are preferably presented as pulse-modulated carrier signals of a particular frequency within the telephone circuit transmission band. Alternatively, the transient spikes are used which an on-line phone produces when dialing continues after communication has been established. A tuned circuit or an amplitude discriminating circuit in the call switching unit presently reprogrammed detects and demodulates and/or decodes the incoming signal and causes the pulses to be stored in suitable format in the memory. The conversation monitor operates analogously to terminate any connection established in the unit after the reprogramming caller has hung up.

The last mentioned mode of communication between a remote caller (in this case the programming subscriber himself) can generally be regarded as an attempt to communicate with a yet unknown conversation partner by transmitting a number to the unit and having it stored therein. If that "partner" calls the number (line A) under which the subscriber can be reached the programmed number will be dialed-out and communication will be established. For a simplified version and reversed roles as to final communication, the call diverting unit can be supplemented, or merely so designed so that the transmitted number is not stored but dialed-out immediately. This way a subscriber can, for example, make long distance calls without immediately incurring charges other than the local call to his office; the long distance charge will appear on his office phone bill.

Another feature of the unit itself is that it is basically operable in two modes which can be called "operate mode" and "standby mode." (The reprogramming mode being possibly a third one). In the operate mode, any call coming in through line A is immediately transferred to the number held in the memory via line B. The standby mode is provided as a safeguard. The unit is normally in the standby mode if the subscriber is actually in his office and wishes to answer the telephone personally. In other words, the unit does not have to be connected for inhibiting immediate call transfer, but is, instead, placed into the standby mode.

The unit, however, does not respond to incoming calls in the standby mode immediately, but defers call switching for a particular period. If that call is answered promptly, the unit resets again immediately, but if not answered, the unit switches to the operate mode and transfers the call (and any calls thereafter) to the number held in memory. This way a subscriber has the option to answer or to have the call transferred, for example, to the answering service. The automatic mode change is also a safeguard, to cause the unit to place itself into call transfer operation in case the user has forgotten to change from the standby mode to the operate mode when he was leaving the office.

A message light is turned on when a call came in, and was transferred. Upon returning, the subscriber can see whether or not any calls did come in during his absence. The turning off of the message light automatically sets in motion the dial-out sequence to reach the desired party without having to dial the number. This will be used specifically in answering service type systems.

As stated above, dial tone is distinguished from other signals by detecting persistence of signals in either line, A or B, above a particular amplitude. The timing unit in the tone detector may be adjusted for different periods of persistence as detection criteria for dial tone under different circumstances. Initially, dial tone in line B should be detected prior to dial out. The period can be short, such as one second, as other signals having such duration cannot be expected at that time (line switching noise is considerably shorter). Later, during conversation monitoring, the dial tone-conversation discrimination requires longer persistence at the same level in order to distinguish dial tone from conversation, the latter rarely being persistently at the response level for ten seconds, for example.

Another feature, optional in nature, but supplementing the basic unit, permits conference calls. A regular telephone is usually connected in parallel to line A to answer the call directly in the standby mode. As a call came in and was answered directly, the unit does not operate. However, the subscriber now calls through a second telephone on line B and by manual control links lines A and B; he himself uses still his line A or his line B telephone.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings in which:

Figure 1:
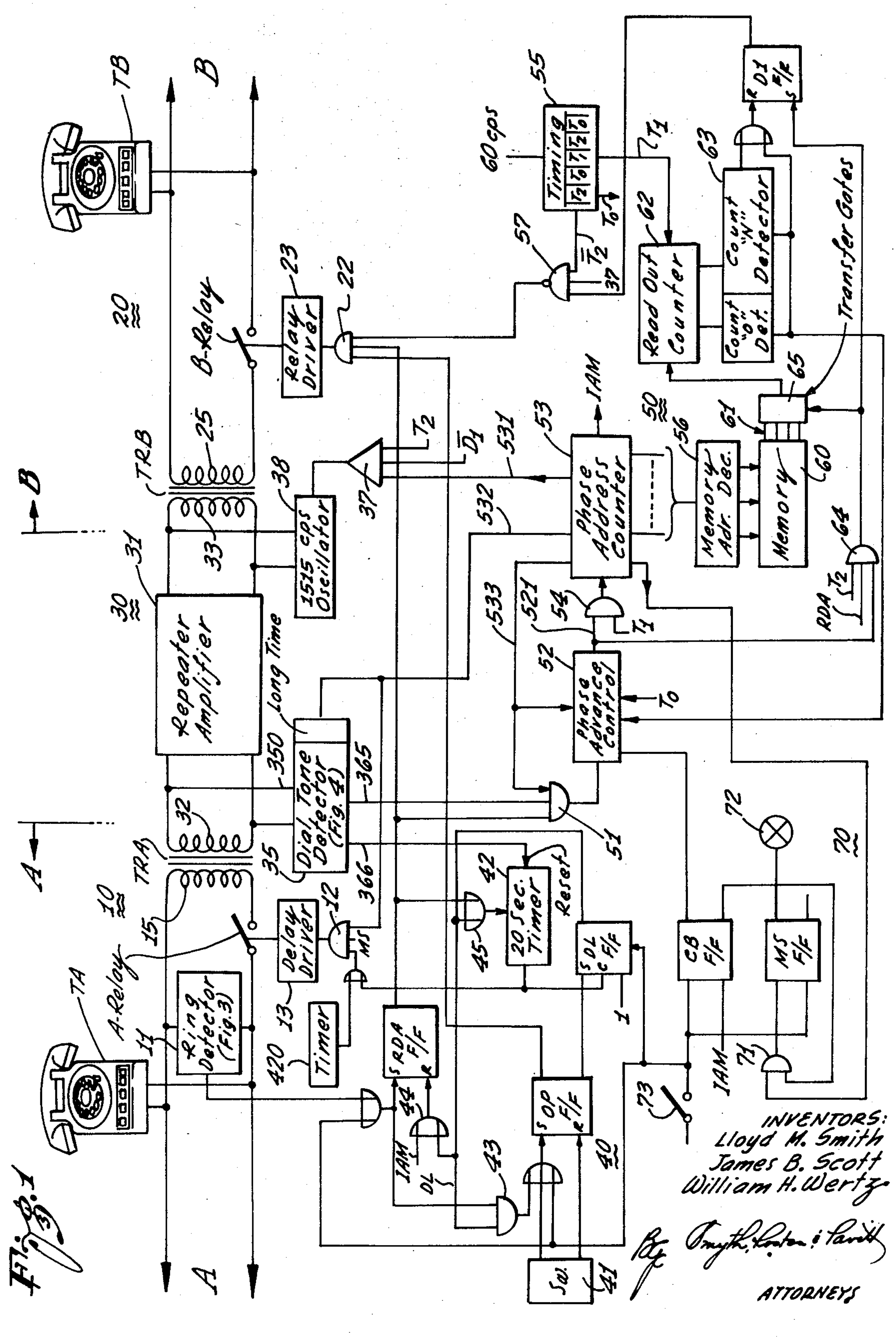
FIG. 1 illustrates partially a block diagram, partially a circuit diagram of the building blocks constituting the basic system in accordance with the present invention supplemented by optional elements for cooperation in an answering system.
Figures 2A, 3, 4:
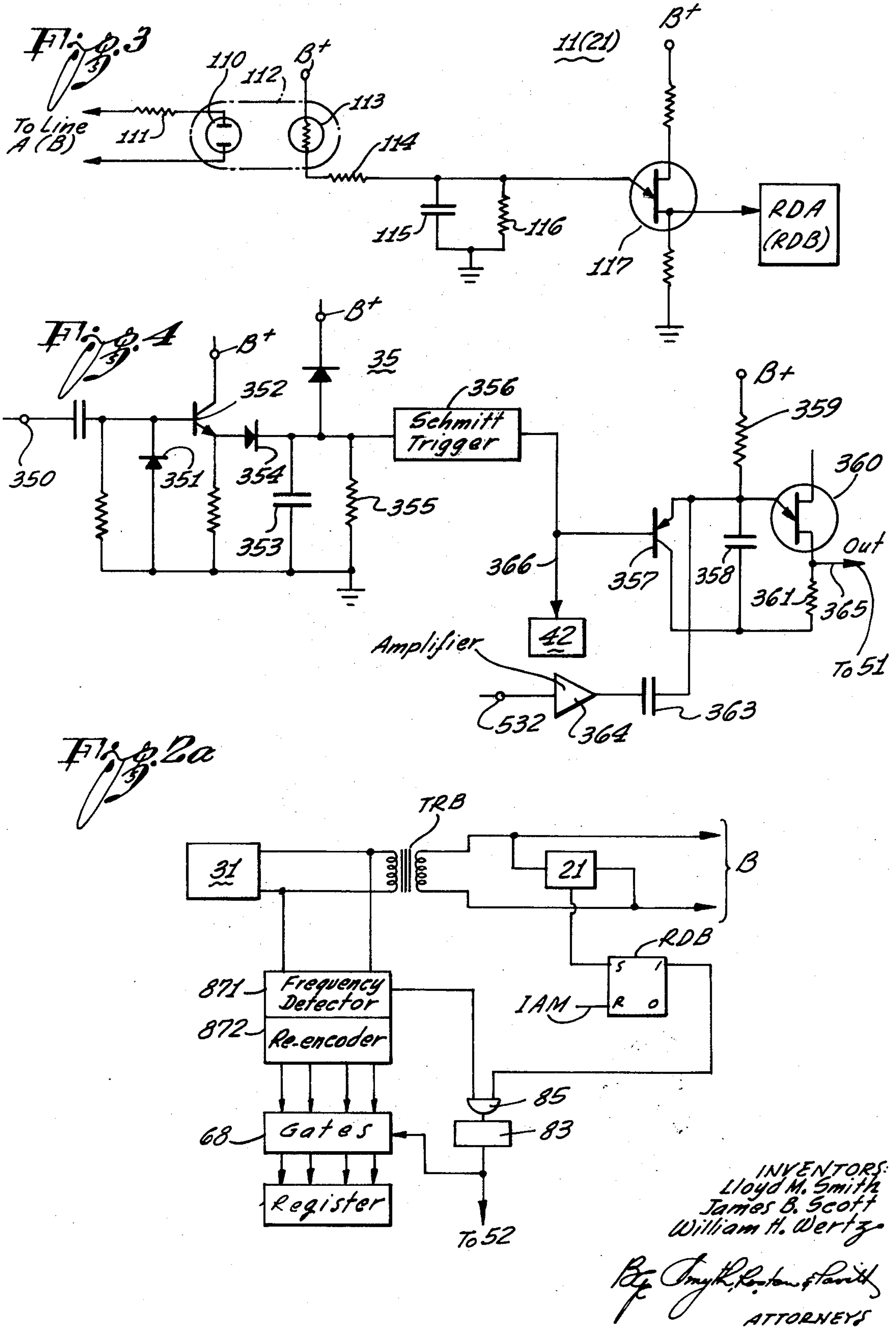
FIG. 2 illustrates a block diagram for modifying and supplementing the system shown in FIG. 1 for remote and local reprogramming.
Figure 5:
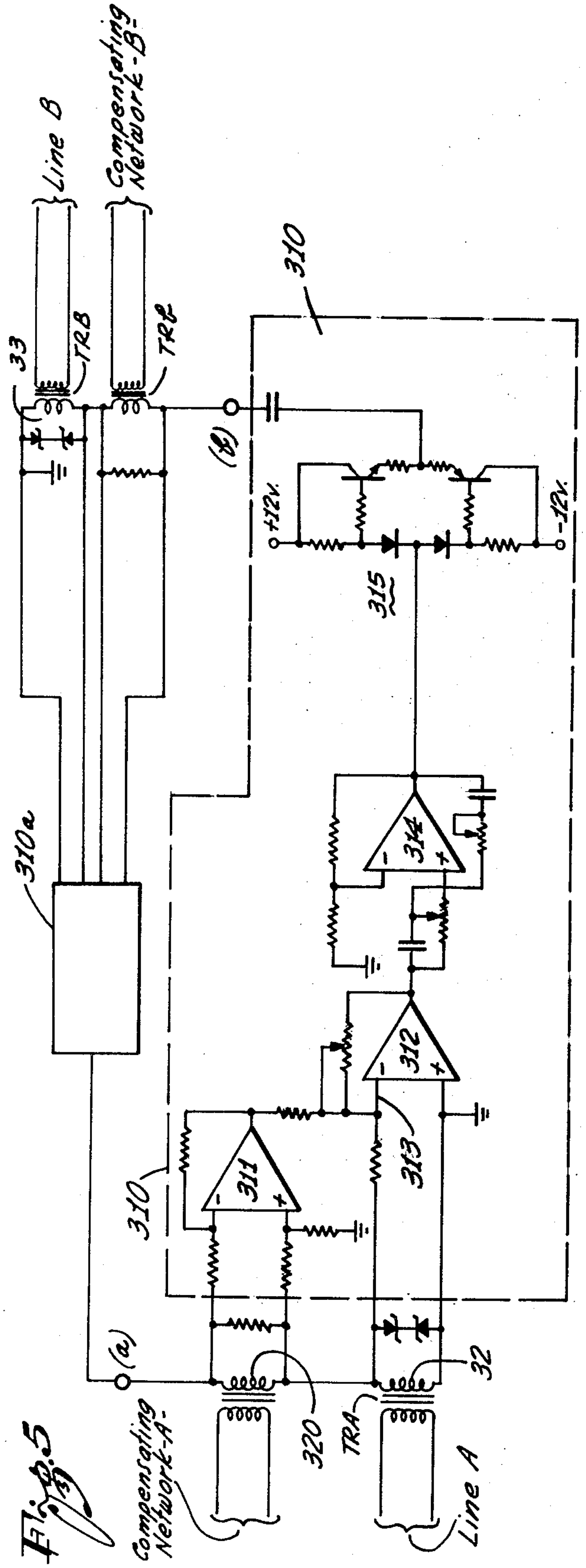
Figure 7A:
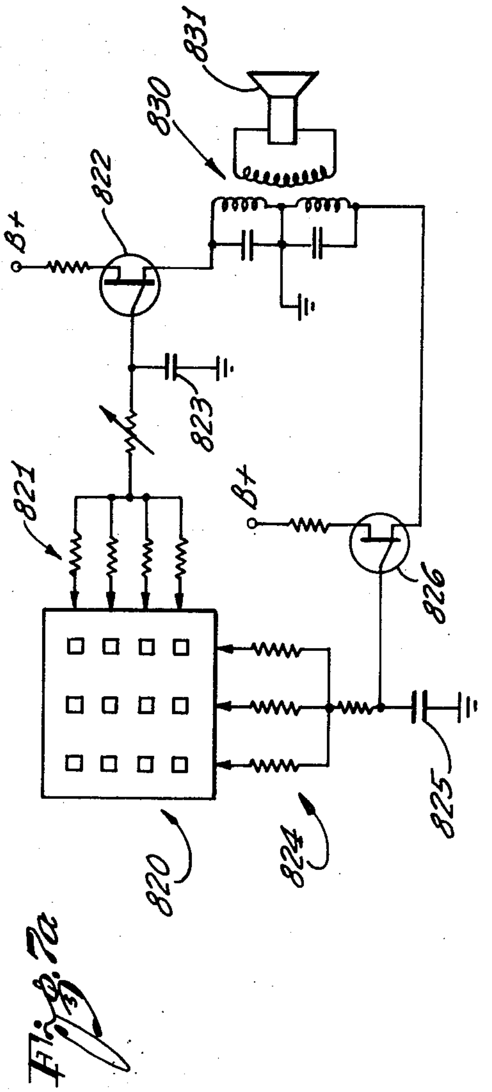
Figure 6:
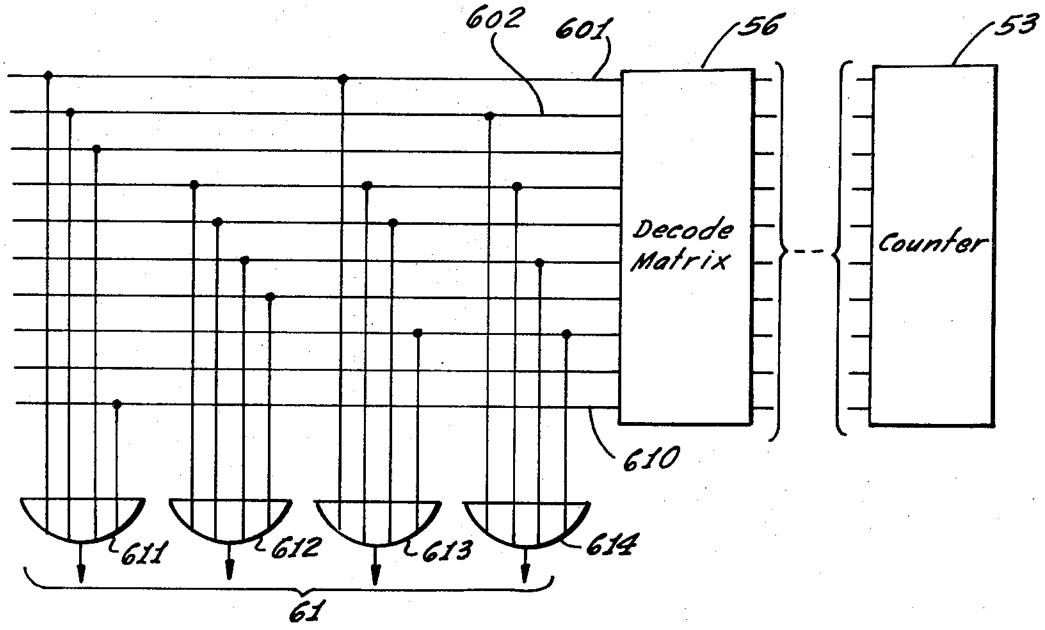
Figure 8:
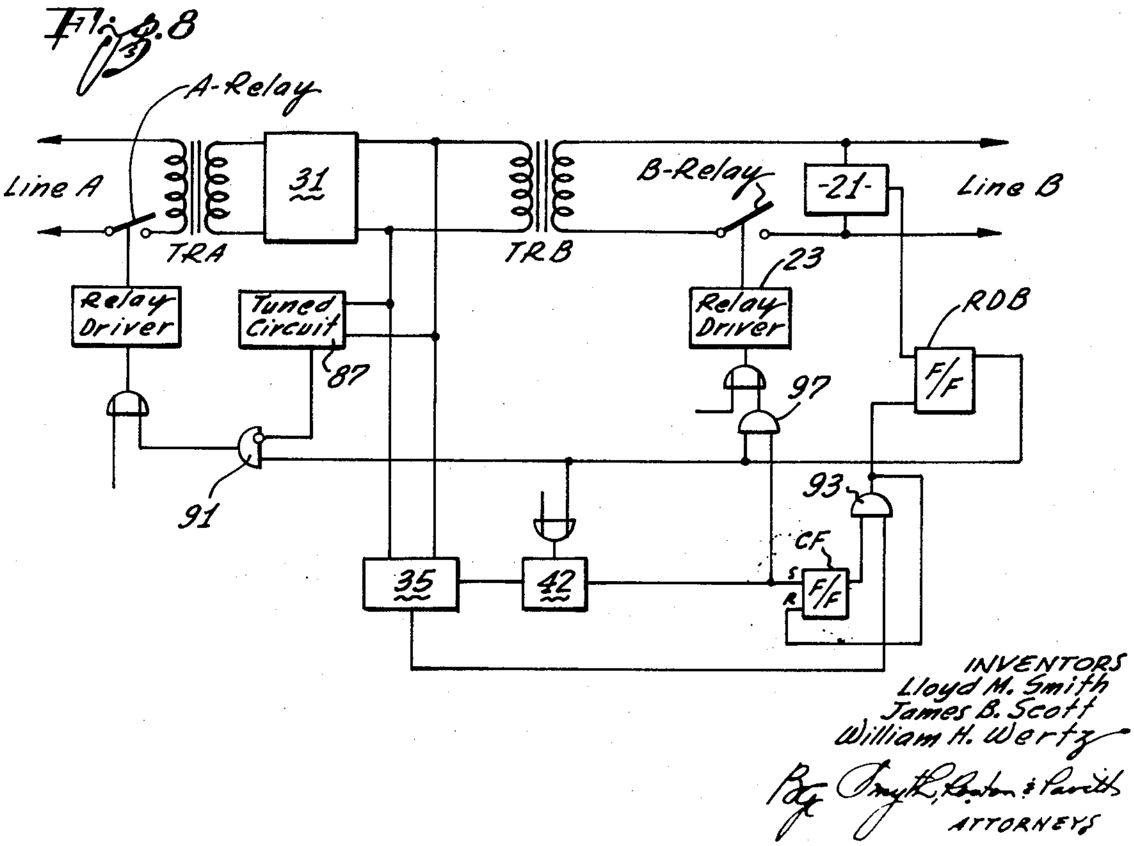
Figure 9:
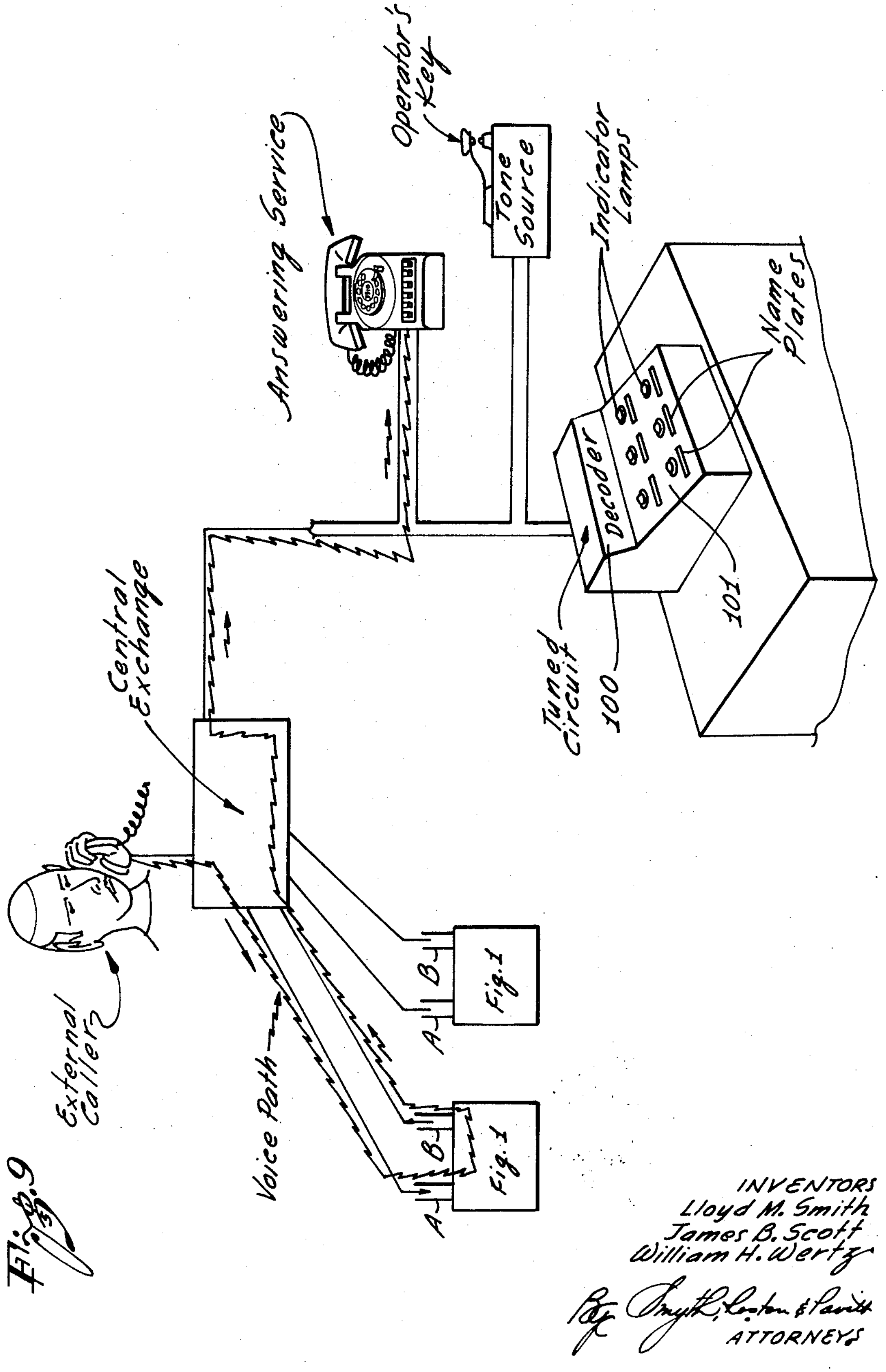

FIG. 2*a* illustrates a block diagram for modifying and supplementing the system shown in FIG. 1 for remote reprogramming by tone signalling;

FIG. 3 illustrates partially a block diagram and partially a circuit diagram of the ring detector(s) employed in the circuit shown in FIG. 1 and FIG. 2;

FIG. 4 illustrates partially a block, partially a circuit diagram of a tone detector employed as dial tone detector and conversation monitor in the system shown in FIG. 1;

FIG. 5 illustrates partially a circuit diagram and partially a block diagram of a repeater amplifier employed in the circuitry of FIG. 1;

FIG. 6 illustrates a manually adjustable, but otherwise read-only memory used in a fixed or locally programmable memory for a system shown in FIG. 1;

FIG. 7 illustrates partially a circuit diagram, partially a block diagram of a unit by means of which the subscriber can communicate with his own call diverting unit from a remote location via the telephone lines, for example, for reprogramming of a unit shown in FIG. 1 as supplemented by elements shown in FIG. 2;

FIG. 8 illustrates schematically circuitry for supplementing the system shown in FIG. 1 to establish dialthrough operation, but having also utility by itself or in a system supplemented as shown in FIG. 2, in conjunction with external use of the instrument shown in FIG. 7; and FIG. 9 illustrates schematically an overall answering service system.

FIG. 7*a* is a circuit diagram for a remote circuit for tone signalling reprogramming.

GENERAL DESCRIPTION

Proceeding now to the detailed description of the drawings, in FIG. 1 thereof, there is illustrated a block diagram of a call transfer and switching unit in accordance with the preferred embodiment of the invention. The unit illustrated in this figure can be regarded as a circuit which includes the essential components of a system serving as a "core" for a family of units or types, whereby different individual types result from particular additions, omissions, and/or modifications to be described more fully below. However, the call transfer and switching unit as shown in FIG. 1 includes additionally, circuitry to establish a particular type of unit for use in an answering service system.

Common to the use of any type within the entire family of units is the provision that the user of such a unit is presumed to be a subscriber for two telephone lines, in the following called lines A and B, and being associated with two (or more) different telephone numbers accordingly. Of these, the number for line A is the normally used, listed telephone number of the user, while the number for line B may be an unlisted number. In other words, calls are normally expected to come in on line A only, not on line B. The user is also presumed to have two regular telephones TA and TB respectively connected to lines A and B. However, it is not required for operation of the system that these phones are in fact connected. The unit to be described in the following is essentially connected in parallel to each of these telephones and constitutes an extension for each of them. The function of the unit is to provide a controlled connection between line A and line B.

Essentially the unit can be described as having the following components or sections. There is first a section 10 for connection and cooperation with line A; section 10 includes an A relay serving as line switch and operating in parallel and in the alternative for the receiver switch of telephone TA. Section 10 essentially receives calls to be switched and transferred.

A section 20 provides a switching for calls from and to line B, and includes a B relay as alternative and parallel switch as to telephone TB. A section 30 is the connecting linking or coupling circuit for operatively coupling lines A and B to each other for direct communication between them. Section 40 is the input control section establishing two different operating modes for the system. Section 50 is the memory section and phase-of-operation-control, including particular storage facilities 60 holding manifestations of the telephone number to which a call is to be transferred. In principle, these components and sections are used in most types of units establishing the family of systems, but in particular the construction of sections 40 and 50 may differ.

As stated above, the call transfer system will be described in the following in relation to a telephone answering service, i.e., it is presumed that each incoming call is to be transferred to a telephone answering system and the number stored in storage facility 60 is the telephone number of the answering service. For this type of system, a call-back section 70 is provided as an optional, additional feature to facilitate operation.

CALL RESPONSE

By operation of a mode switch 41 the system can effectively be placed into the operate mode or the standby mode; an operate flip-flop OP is connected to be set or reset accordingly. At present it is presumed that the system is in the operate mode, and the several elements employed in the system will be described in the order of their becoming effective when a call to be transferred comes in. The flip-flop OP can be set manually to establish the operate mode, but it can also be set through internal operation to change from the standby to the operate mode under certain conditions. Flip-flop OP stays set as long as it is not manually reset by switch 41 to place the unit in the standby mode at will of the user.

Assuming a call comes in through line A, a ring detector 11 will respond to the ringing signal. A ring detector employed with particular advantage in the system will be described more fully herein below with reference to FIG. 3. The ring detector is designed to respond to a large variety of ringing signals. Even though the ringing signal is the same once the unit is installed, ringing signals vary all over the country, but the detector 11 can be used anywhere and does not require adaptation when the unit is installed. Briefly, the ring detector is designed to integrate a plurality of pulses derived from ring signal peaks, and the energy of pulses required for the integrator to reach a particular level is in excess of that associated with dial pulses which can appear in sequence (10) at dial pulse frequency which is about 10 cps. Lower frequencies are not used for ringing. This way ringing signals are distinguished from dialing. Moreover, the ring detector rejects common mode signals in line A.

As the call comes in, telephone TA will ring likewise, but is presumed not to be answered directly. The response of ring detector 11 causes a ring detector flip-flop RDA to set, which, in turn, provides an enabling signal to an AND gate 22 in section 20. The gate 22 receives as a second enabling signal the set side output of operating flip-flop OP, and, therefore, is permanently enabled in the operate mode. The third input of the three-input gate 22 is normally enabled through the output side of a NAND gate 57, and its temporarily disenabling will be described later in this specification. It follows, therefore, that in direct response to an incoming call in the operate mode, gate 22 turns true immediately and energizes a B relay driver 23 closing the B relay blade. This is analogous to lifting the receiver of telephone TB as far as line B is concerned.

The system now waits for a dial tone. Generally, dial tone will, at times, be detected on line B or on line A, therefore a dial tone detector is included in the coupling section 30. The coupling unit 30 includes a repeater amplifier 31 to be described more fully below with reference to FIG. 5. Coupling unit 30 is provided further with a pair of transformers, TRA and TRB. A pair of windings 15 and 32 selectively operate as primary and secondary windings and connect line A to repeater-amplifier 31. Transformer TRB includes a pair of windings 25 and 33 also operating s electively as primary and secondary windings to connect repeater amplifier 31 to the line B. Presently then, the coupling section is connected to line B as the B relay closed upon response at line A ring detector 11. It should be mentioned that a repeater amplifier is not required in all cases. In areas particularly where calls are regularly amplified, such a repeater is not needed. In this case, there is direct transformation coupling of lines A and B.

The coupling section 30 includes, furthermore, a tone detector 35. Detector 35 will be described more fully below with reference to FIG. 4. Detector 35 has a dual function. It detects absence or presence of communication above a particular db level (output in line 366) of minimum duration and it includes a timing circuit to detect presence of a dial tone as distinguished from normal conversation (output in line 365). The timing circuit within detector 35 essentially distinguishes conversation and other communication signals from dial tone by monitoring persistence of the latter for a period during which normal communication is never sustained at a predetermined db level without at least briefly to drop. Detector 35 is connected to coupling section 30 to monitor the existence of dial tone either in line A or in line B, provided either the A relay or the B relay or both are closed.

DIAL-OUT (MEMORY AND TIMING)

At present it is presumed that in response to an incoming call in line A, the B relay has closed. Therefore, the tone detector 35 monitors presence or absence of a dial tone in line B. If a dial tone is detected, the dial tone detector 35 produces an output in line 365 which is passed to a gate 51 already enabled by the RDA flip-flop. Gate 51 provides an advance control signal to a phase advance control circuit 52 of section 50.

The section 50 includes a phase and memory address counter 53 receiving input pulses through a gate 54 whenever so permitted by the phase advanced control circuit 52. In essence, the advance conyrol circuit 52 is an assembly of gates and flip-flops which monitor the absence and presence of particular conditions requiring phase advance. These conditions arise generally within the system and occasionally the phase itself, in which the system is at any instant, is one parameter in the decision whether or not there is to be an advance of the phase counter. If so, an enabling signal is passed to an output line 521 of advance control 52, for enabling gate 54. An output signal of the dial tone monitoring gate 51 is one condition which prompts response of the advance control to emit an enabling signal into line 521.

In order to synchronize overall operations, section 50 includes a timing circuit 55 which provides cyclically a sequence of approximately similarly long timing pulses, respectively called T0, T1 and T2, each being approximately 33 ⅓ milliseconds long, the total repetition cycle, therefore, being 100 milliseconds, as stated.

The advance control circuit itself accepts inputs requiring a change in phase of operation at times TO represented by the timing pulses of like designation having, as stated, 33 ⁻ millisecond duration and following each other at 100 millisecond spacing. The advance control provides an enabling signal through line 521 to gate 54 from the trailing edge of a pulse T0, to the leading edge of the next one, if there was a previous change in inputs for the advance control. Gate 54, when enabled, passes timing pulses T1, regularly interspaced with pulses T0, to the phase counter 53. These gated pulses T1 advance the phase counter.

The output of gate 51 provides one of the inputs for advance control circuit 52 and when the output of gate 51 turns true, advance control circuit 52 responds at the next pulse T0. It follows from the foregoing that as soon as a dial tone has been detected in line B, phase advance control 52 is triggered at the next pulse T0 and the succeeding pulse T1 advances phase counter 53 from the rest or idle state to the next state.

As part of the system the phase counter 53 serves also as an address counter for memory 60. The memory has individually addressable storage locations holding various items of information including representation of the digits of the telephone number to which the incoming call is to be transferred. Each digit is held in a separate location in a particular format. A memory address decoder 56 responds to particular count numbers of counter 53 and interprets them as memory address codes to provide addressing signals to memory 60. Thus, only particular count states of counter 53 are individually associated with particular storage locations of memory 60.

As will be explained as to detail more fully below, further phase and address counter advance, after the initial dial tone detection, is predicated on the following principle: Concurrent with each phase advance, a number is set into a recycling UP counter 62 which number is subsequently incremented up to recycling. If count state zero is reached either (a) because the counter has recycled, or (b) because the number set into the counter 62 is zero or (c) there is no memory location associated with the phase counter number, so that the counter 62 is necessarily charged with a zero, the phase counter advances. For particular phases as represented by particular numbers of phase counter 53, the phase advance in that manner is deferred until a dial tone has been detected and until a signal has been provided by gate 51 accordingly. Whether or not these particular phases instigate a phase advance also under condition (c) is optional, but may facilitate overall design.

It is assumed that each memory location of memory 60 is defined by four bit cells together defining a four bit number, each bit being bivalued, and each number in the several individually addressable locations of memory 60 presents a digit to be dialed out. Therefore, in order to dial-out the usual seven digit number, seven different memory locations have to be addressed in sequence. In general, this memory readout and subsequent dial-out of the entire telephone number represented by the number stored in the several memory locations proceeds as follows.

Proceeding with the events transpiring after a call has come in, it is presumed that the first memory address is accessed through the phase counter 53 after having been advanced upon dial tone detection after closing of the B relay. Decoder 56 responds and addresses the first memory location having lowest number. A special situation will be discussed below, presently it shall be presumed that that location holds four bits representing the highest digit of the telephone number of the telephone answering service, and these four bits are applied to the four line output bus 61 of the memory.

In response to a timing signal T2, a set of altogether four transfer gates 65 transfers the four bits contained in a memory location into a four stage readout register counter 62. A control gate 64 for the transfer gates 65 uses the same enabling signal (line 521) from control 52 which is also used for opening gate 54. As stated above, this enabling signal lasts from the trailing edge of one pulse T0 to the next one. Furthermore, a signal T2 succeeds a signal T1 (which may have advanced the counter 53) but occurs prior to the next signal T0, removing the phase advance output until the next significant change of inputs for control 52. Thus, the signal T2 presently considered is a last one in a T0, T1, T2 sequence associated with a memory addressing and readout step. The signal T2 now causes transfer of the content of the addressed memory location into register counter 62.

The output of control gate 64 also sets a dial-out flip-flop DI. The set output side of dial-out flip-flop DI is coupled to the NAND gate 57 which receives also the inverted timing pulses $\overline{T2}$. Disregarding for the moment the third input for gate 57, the output thereof controls the third input of the relate driver control gate 22 for the B relay. The dial-out of pulses requires a temporary opening of the B relay and this is produced by the inverted timing pulses $\overline{T2}$. As long as dial-out flip-flop DI is set, the output of NAND gate 57 turns false with each timing signal $\overline{T2}$, which in turn means a temporary disabling of gate 22. As gate 22 turns false, the relay driver 23 opens B relay. Thus, dial pulses are sent into line B as long as flip-flop DI stays set.

The dial pulses $\overline{T2}$ follow each other at the cycle rate of timing unit 55 which is 10 cps and each pulse has a duration of two-thirds of one-hundredth second. The resulting circuit interruption in section 20 leading to line B have thus the proper format and characteristic of dial pulses.

Generally, a digit is dialed out by producing a particular number of dial pulses. This number is metered by a counting process which in turn controls the duration of the set state of dial flip-flop DI. The number of dial pulses of a sequence representing a decimal digit of the telephone number to be dialed out is determined by the duration of the set state of flip-flop DI. It should be observed, however, that the number held in a memory location in representation of a telephone number digit is not the digit itself, but the binary N's complement thereof. This is a matter of operational convenience, and it is quite possible to store the digits directly in binary coded decimal format. However, for the chosen implementation it was found to be more convenient to use the N's complement.

After a particular digit in that format has been read from the addressed memory location and passed to the readout register counter 62, the counter begins to count pulses T1 as derived from the timing unit 55 and increments that number. As long as dial-out flip-flop DI is set, dial pulses are sent through the gates 22–57 to operate the B relay in synchronism with the counting process. Counting and dial-out continues until number N has been reached. A "count N" detector 63 is coupled to counter 62 as a "number N decoder." As the detector responds it resets dial flip-flop DI. Counter 62 has been incremented to value N if the desired number of pulses has been added to the N's complement of the digit to be dialed out, so that the correct number of dial pulses for a sequence has been metered.

The output of NAND gate 57 remains true, independently from pulses T2 after dial flip-flop DI has been reset. This terminates, however, a dial sequence, it does not terminate the operation of the counter. Instead, the incrementation continues until counter 62 has reached a number M. That could be any other number but as a matter of convenience M should be the highest number of counter 62, causing it to recycle. In essence, upon counting from N to M a pause of fixed duration is counted out.

At count state M counter 62 recycles to zero and a "-count zero" detector 66 responds and triggers again the phase advance control circuit 52. The next following pulse T0 accepts that change, the next pulse T1 thereafter advances the phase counter 53 so that a new memory location is addressed, and its content is transferred via bus 61 and transfer gates 65 to read out counter 62. The transfer occurs at the next pulse T2, and since it is assumed to be a non-zero number, a dial-out flip-flop DI is set again without immediate resetting from detector 66.

It can, therefore, be seen that memory locations are addressed in sequence, the N's complement of the several telephone number digits held in these locations is transferred to the readout counter. The digit itself is dialed-out until the counter has been incremented to number N, thereafter a pause is metered, causing the readout counter to continue counting until recycling to count number 0, whereupon the phase counter 53 advances.

This operation continues until the phase advance counter 53 has reached a particular number which is not associated with a particular memory address, instead, a waiting state is established. Normally, as a pulse T2 causes transfer of the content of the currently addressed memory location to counter 62, count zero detector 66 turns false before the output of gate 64 turns false, so that at the end of that period T2 dial-out flip-flop DI is not reset. If, however, no digits are set into the counter 62, detector 66 remains true and holds flip-flop DI to the reset state. This will be the case when the phase advance control 52 has advanced the phase counter to a count state unassociated with a memory location. This in turn is presumed to occur if the stored telephone number, for example, of an answering service has been dialed out. Moreover, this phase now arrived at is one wherein by operation of the loop 533, further phase advance requires as an additional condition, dial tone detection.

If the unit is not used as in an answering service system, or in a simplified version, operation will proceed as follows.

The particular phase arrived at by counter 53 is decoded (output line 532) and controls a gate 12 which, in turn, controls a relay driver for the A relay closing the same. The call has now been diverted from line A via the closed A relay, unit 30, the closed B relay, and to line B. Up to that point the A relay was open, i.e., the caller heard ring-back. Now, after dial-out of the transfer number, with both relays A and B closed, the caller hears ring-back but now from the outgoing call through line B. Whether or not the number dialed out is answered is immaterial, the system is now in the conversation mode. Further phase advance is predicated on dial tone detection. Why this is so will be discussed later, presently an alternative operational process will be described first.

DIALOG WITH ANSWERING SERVICE

For a more sophisticated type of unit used in an answering service system, however, communication is not established immediately after dial-out of the number of the answering service, i.e., the phase arrived at by counter 53 is not used to close the A relay but establishes a waiting period. As indicated by loop 533, generally, for particular phases gate 51 is enabled to render the phase advance control responsive to dial tone detection and to cause advance when dial tone is detected.

The answering service responds to the arriving call automatically or manually (see FIG. 9), and sends back, i.e., into the unit via closed line B relay, a persistent tone equivalent to a dial tone to which detector 35 can respond. Gate 51 responds again, and the waiting state together with this new response of detector 35 triggers phase and advance control circuit 52. The phase advance counter 53 is thus advanced again to another counter state, again associated with the address of a memory location.

It is now presumed that memory 60 has additional locations which collectively hold a multi-digit, subscriber identification code, and the first digit thereof is held in the memory location now addressed. This first digit is transferred to register counter 62 and incremented, first to number N and then up to the recycle number M of the counter, just as in case of dial-out as aforedescribed. During part of the incrementation process flip-flop DI is set, and it is reset when number N has been reached. After counter recycling the phase counter advances, etc. Thus, the memory readout process, the processing of the numbers read, the phase counter advance and the sequential addressing generally proceeds as in case of dialing out. However, the period during which flip-flop DI stays set for metering a number of pulses, is used differently because the B relay must stay closed during this operation.

A control gate 37 receives the signal $\overline{DI}$ and the pulses T2. A third signal for NOR gate 37 is derived from phase counter 53 (output line 531) through a decoder therein. That signal passed through line 531 is false only during the range of numbers identifying memory locations which hold the ID code. Otherwise, and particularly during operations preceding ID code memory readout, the signal in line 531 is true, clamping the output of NOR gate 37 to the false level. This in turn is used as an enabling signal for NAND gate 57 during memory readout for the dial-out operations as described previously. Thus, the output of NOR gate 37 turns true during memory readout and during incrementing of the ID code digits in synchronism with the signal $\overline{T2}$. The same signals are applied to NAND gate 57 as disabling pulses so that they do not operate as dial pulses for the B relay, the B relay, therefore, remains closed as is necessary.

Each pulse produced by gate 37 enables an oscillator 38 coupled to section 30, for example, directly across the winding 33, or a portion thereof, to send out bursts of pulses at the rate of timing signals T2, but having the frequency of oscillator 38, for example, 1,515 cps at a duration of 66 ⅔ milliseconds each. These pulses are sent through line B to the answering service. Thus, the answering service receives groups of pulses, each group comprising a number of pulses equal to the N's complement of a digit read from memory and defining a digit of the ID code. The circuit as described thus transmits a pulse-modulated carrier of 1,515 cps in representation of an ID code.

Turning again briefly to FIG. 9, the pulse groups are received by a decoder 100 at the answering service, and the subscriber is thereby identified. An indicator lamp or a digital readout in the indicator panel 101 is triggered in response to a particular code as decoded which lamp or readout indicator represents the particular subscriber from whom the incoming call has been transferred. The panel 101 is located in plain view to the operator in the answering service, and the several lamps thereof may be associated with name tags or the like. Thus, the operator knows immediately from whom a call has been diverted. It should be mentioned that this may transpire before the A relay in the call transferring unit has been closed, i.e., before the call made to line A is finally answered as to the caller.

Turning back now to FIG. 1, after the last ID code digit has been incremented, phase and address counter 53 reaches a state which again is not identified with a memory location and instead, the output line 532 leading to gate 12 is enabled to close A relay. The system is now presumed to be in the conversation phase. For the present this is the final step in establishing communication between lines A and B. The caller who made a call through line A is now connected through the closed A and B relays. The conversation with the answering service can now progress.

CONVERSATION MONITOR

As was mentioned in the introduction, the progression of conversation must now be monitored. This does not mean "listening in," but the signal level in the communication link must be monitored to determine absence or presence of actual communication. It should now be remembered that only in some areas will there be a dial tone directly in the line of the called party after the calling party has hung up. In other areas, the called party will receive a dial tone only after likewise having hung up. On the other hand, as long as a calling party has not hung up, an interruption in the line of the called party does not interrupt the connection. Within the system, the call transferring unit is the called party as to line A and the calling party as to line B. When the caller has hung up there may be a dial tone in the system, but this is not certain. On the other hand, interruption of the connection at line A during conversation or otherwise, when both parties have not yet hung up, will not interrupt the connection.

As will become apparent more fully below, the tone detector 35 does, in fact, monitor the level of the communication signals as passing into or through section 30. Therefore, aside from monitoring the presence of a dial tone, it also responds to conversation. Presence of a dial tone is signaled through output line 365, presence of communication is signaled through an output line 366. Conversation will not cause detector 35 to produce an output in line 365. Operation of detector 35, particularly as to this distinction will be described more fully below with reference to FIG. 4. Suffice it to say that the second output line 366 provides a reset signal to a timing unit 42 each time the sound signal level within section 30 exceeds a particular level. Thus during normal conversation, timer 42 is continuously reset.

This timing unit can be a regular reset integrator with switching output, providing a particular logic "true" output for little over half a second (600 milliseconds) after having not been reset for 20 seconds and every 20 seconds thereafter. The timing unit 42 is enabled through a two-input or gate 45 when turning true. In the operate mode the other input of OR gate 45 is permanently false.

The first input of OR gate 45 turned true as soon as in response to an incoming call flip-flop RDA was set. As there was soon a dial tone in the input circuit of detector 35 (relay B closed), timing unit 42 was reset by the corresponding output in line 366 of detector 35. Detector 35 responded also to the dial pulses sent out, possibly also to the ring-back signal thereafter, and the subsequently ensuing conversation. It is emphasized, however, that this is incidental, and the possible detection of the ring-back signal has no bearing on the operation. In particular, the timer 42 does not have to be reset until actual conversation begins. Thereafter, timer 42 stays in the reset state, except during a conversation lull, but is reset immediately as soon as communication is resumed.

Assuming now that the conversation has been terminated, and that the calling party (on line A) has hung up, timer 42 is now permitted to run and after 20 seconds it provides an output pulse of 600 millisecond duration. The output of timer 42 is connected to gate 12 and normally provides an enabling signal thereto. After the timer has run, its 600 millisecond output pulse disables gate 12, causing the A relay to open for that duration. The purpose thereof is to determine whether or not in fact, the calling party is still on line or has hung up. Interruption of line A is effectively an interruption of the called party. If the calling party on line A has hung up (as presumed) the temporary interruption of line A should invoke a dial tone after reclosing of the A relay.

The dial tone detector 35 monitors presence or absence of a dial tone throughout the conversation or other communication. As soon as a dial tone is detected for any reason, the gate 51 responds as before, which causes phase advance control 52 to recycle the phase counter 53 into the first state which is the inactive state. Counter 53 will now produce the signal IAM causing flip-flop RDA and others to reset. Relay B is opened directly when flip-flop RDA is reset. The operation of phase counter 53 caused also an enabling signal to be removed from line 532 so that gate 12 likewise turns false and relay A opens. The unit is now deactivated but ready to receive another call to run through the same cycle as described.

The possibility exists that the tone detector did not produce timer reset pulse in line 366, simply because there is a conversational lull, and the calling party on line A has not hung up. In this case temporary opening of the A relay will not interrupt the connection, nor will there be a dial tone after reclosing. Every twenty seconds the line will be proved through temporary opening of line A, as timer 42 is constructed to periodically produce the disabling output pulses for gate 12 at 20 second cycle rate and for 600 millisecond duration each, if not reset. If conversation is resumed timer 42 is reset as before. It is, however, important that the A relay opening signal as derived from timer 42 does not interrupt regular conversation or other communication (transmission of data, etc.), as the timer is reset by the conversation or other communication, and thus inhibited to produce a sampling output for opening the A relay.

A special safeguard is needed for the following situation. Assuming a call has been transferred and the phone rings at the number which has been dialed out. The system is now in the conversation mode and monitors the conversation level. Assuming the phone to which the call is transferred is not answered ringing continues and there is ring back entering the system through line B. That ring back may be sufficiently strong to cause tone detector 35 to respond just as if conversation is in progress. Ring back will be sufficiently frequent to prevent the timer in detector 13 to run. Thus, even after the caller (line A) has hung up, the system may stay in the conversation mode, so that in fact there is "hung up."

A timer 420 prevents the aforedescribed situation from persisting. The timer 420 may have the output of ring detector flip-flop RDA, or the conversation mode signal as input causing timer 420 to run. The time timer 420 runs is not critical, three minutes or thereabouts was found suitable. After these three minutes have elapsed, timer 420 provides an alternative inhibitory input for driver gate 12 causing the A-relay to open briefly. A dial tone is invoked thereby if the caller on line A has hung up in the meantime. Thus, the system will reset as aforedescribed.

The timer 420 should have a repetitive operation, as the caller on line A may be a persistent one who has not hung up after 3 minutes. Of course, operation of timer 420 briefly interrupts conversation, but in 3 minutes intervals only which provides very little disturbance. Moreover, it can serve as an inherent three minute-interval indicator as the parties will hear a distinctive clicking noise.

The invention should be modified to have the output of timer 420 control the input of timer 42 independently from the output of the tone detector.

OPERATION SUMMARY

As a call comes in via line A, ring detector 11 responds to set flip-flop RDA which in turn closes the B relay and prepares gate 51 for dial tone reception. As dial tone is received from line B via transformer TRB, detector 35 enables gate 51 to enable the phase advance control 52. At the next timing pulse TO an advance control signal is applied to line 521 and the next pulse T1 passes through gate 54 to advance counter 53 to the address number defining the memory location holding digits in representation of the highest digit of the number to be dialed out. The address is decoded (56) and the respective location in memory 60 is accessed. The content of that location is applied to bus 61. The pulse T2 succeeding the pulse T1 which advances address counter 53 opens gates 65 to pass the readout content into counter 62, and to set dial flip-flop DI. Subsequent pulses T1 increment counter 62 and the partially overlapping signal $\overline{T2}$ open the B relay to simulate dial-out as long as flip-flop DI is set. When the count has reached number N, flip-flop DI is reset to terminate dial-out but counting proceeds until the counter 62 recycles, whereupon the memory advance control advances the phase counter 52 by one step. This operation proceeds until the counter 52 reaches a number not associated with a memory location but constituting a dial tone search phase. This may be the conversation phase, or a response signal of dial tone characteristics must be sent into line B from the location (answering serivce) which has been called. In the latter case the counter 52 advances again and calls on several memory locations holding an ID code. Counter (62) incrementing proceeds similarly, but bursts of oscillations (38) are transmitted while the B relay remains closed. Subsequently the conversation phase is reached also in this case.

At the beginning of the conversation phase the A relay closes to link lines A and B through repeater amplifier 31. During this phase the signal level is monitored and timer 42 is reset during regular communication. If the information level stays below the response level of the detector 35 for the period of the timer 42, the A relay is briefly opened and reclosed. If that evokes dial tone, the system is reset as a whole. If dial tone is not evoked, brief reopening of the A relay is repeated until dial tone is evoked.

In case the dialed out call is not answered and ringback maintains the conversation monitor activated, timer 420 will soon open briefly the A-relay and evoke dial tone to reset the system.

MEMORY FORMAT CONSIDERATION

Before proceeding with the description of further details of the circuit shown in FIG. 1, it should be mentioned that the following aspect is or can be included in the circuit 50. It was mentioned above that the telephone number stored in memory 60 was presumed to be a seven digit number. The number of digits dialed out and which can be dialed out by cyclically repeated operation of memory readout, content incrementing and phase and address counter advance, as described, is immaterial. Any empty memory location holding number "zero" when read out causes immediate response of detector 66 which, in turn, advances the phase counter and resets flip-flop DI immediately for "-skipping" over empty locations. Thus, the memory should be designed to accomodate larger telephone numbers, for example, the digit numbers where an area code is included. This operation proceeds until a phase has reached such as the conversation phase, or a phase between dial-out and ID code transmission; in either case further phase advance requires detection of dial tone.

It is repeated here that the unit considered and presently described, is the core of and within a family of systems and is thus adapted to variable size numbers. This includes the provision for an ID code, but if none is used these storage places are just left empty and the phase counter advances until reaching a number outside of the address range of the memory where dial tone is to be waited for. Within the loop connection 533 the particular one signalling the particular phase number between dial number and ID code locations has to be disconnected in this case. In general it can be seen that the phase advance control of the system alternates between phases requiring the presence of a dial tone before advancing counter 53, and phases in which completed incrementation up to the recycling point of counter 62 suffices, per se, to trigger the phase and address advance.

It it readily apparent that the following adaptation is possible without change in design. Dialing out through line B may require a preliminary dialing of a prefix digit, such as a nine. Therefore, the first memory location may hold the N's complement of a "nine." The next memory location holds a zero and is phase decoder-coupled via loop connection 533 to cause further phase advance to be dependent upon detection of dial tone. The situation may be that closing of B relay does not at first produce a dial tone. Thus, the first counter advance to the address of the first memory location holding the prefix number may not be dependent upon dial tone detection, instead, setting of the RDA flip-flop may be used directly to advance the address counter to the prefix number location.

In the description above it was assumed that the system is in the operate mode, i.e., that switch 41 is in position so that the OP flip-flop is in the set state. As was mentioned above, the system can also be standby mode, with flip-flop OP in the reset state. The standby mode permanently inhibits the B relay which can thus not close when ring detector 11 responds to an incoming call. Dial tone cannot be detected and the unit will not progress through the phases as elaborated above. The reason for the standby mode is the following:

It is of principal advantage to have the call transferring unit always connected to the telephone system, even if the subscriber served by the unit or somebody else who could answer the phone is actually present at the location where the unit is installed. The difference between the standby mode and the operate mode is essentially that in the operate mode the system immediately proceeds to transfer the call by dial-out of whatever number is stored in memory so as to forward the incoming call to that number as described. In the standby mode the unit does not dial-out the number immediately, but a certain period of time elapses in which the user, should he be present, has an opportunity to answer the phone TA. If he does not answer the phone, either of his own volition, or because he is not present, but forgot to place the system into the operate mode when leaving, the call transfer unit will automatically shift into the operate mode independent from the position of switch 41 and by internal setting of the OP flip-flop call transfer will then proceed as aforedescribed.

One can see, therefore, that the unit can remain installed and never has to be disconnected. In the standby mode the user can answer the telephone TA but must do so within a specified time. If he does, the call is not transferred for the simple reason that as soon as phone TA is answered, the ringing stops and the unit stays in standby mode. If ringing continues beyond that specified time, the call transfer operation is set in motion.

The principles expounded in the preceding paragraphs are realized by the following circuit, also shown in FIG. 1. Assuming now that the system is in the standby mode, operate flip-flop OP is in the reset state which, in turn, means that the B relay driver gate 22 is not enabled. Thus, in case a call comes in, flip-flop RDA is set, but the B relay is not closed. The phase advance counter is prepared to shift the system into a state in which it looks for a dial tone, but since a dial tone cannot appear with B relay open, the dial tone detector 35 detects "no tone" and nothing further happens.

As mentioned above, failure of detecting any tone inhibits production of a reset pulse in line 35 so that timer 42 is not reset. As the ring detector flip-flop RDA has responded to the incoming call, timer 42 is enabled through gate 45 and begins to run with the first ring. Normally, when the system is in the operate mode, dial tone detector 35 resets the timer after B relay closes, upon detection of dial tone. However, in the present situation B relay remains open, so that there is no dial tone and the timer is permitted to run for twenty seconds without being reset.

The timer provides an output which serves as a clock pulse for a control or timer flip-flop DL which is normally reset but can toggle in the standby mode. Its set input is disabled by $\overline{OP}$=0 in the operate mode. Therefore, this flip-flop does not participate in the operations described above for the operate mode. In the standby mode, flip-flop DL is set by the first output pulse of timer 42. The setting of flip-flop DL controls three different operations.

First, flip-flop RDA is reset to establish a condition as if there was no ringing up to that time. Second, the set state of flip-flop DL operates as an alternative input for OR gate 45 to maintain timer 42 operating even though $\overline{RDA}$=1. Third, the flip-flop DL provides an enabling signal for the duration of its set state to a gate 43. At the next ring (if occurring) a signal as provided by ring detector 11 is permitted to pass through the enabled gate 43 and its output causes the operate flip-flop to set, so as to shift the system into the operate mode. As there still is no detectable tone in the input circuit of detector 35, it provides no resetting signal to timer 20. Therefore, for another period of 20 seconds the system is in the state of waiting for that ring which is supposed to place the system in the operate mode. Should that ring not occur, then at the end of that second 20 second waiting period, flip-flop DL is toggled again and removes the enabling signal from gate 43; the system stays in the standby mode.

If a ring occurs while the system is in the standby mode, but after flip-flop DL has set, the operate mode is established, flip-flop RDA is set again and the system now proceeds just as in the operate mode. Any further calls find the system in the operate mode. On the other hand, it can be seen that if there was a first ring causing the ring detector flip-flop RDA to respond, (with flip-flop DL being reset) and a person answered the telephone TA at that time, the ringing stopped. If the telephone was answered right away, dial tone was detected soon thereafter so that the timer 42 was reset and control flip-flop DL was never set. If the first 20 second waiting period elapsed and during the second 20 second waiting period there is no ringing, the system still stays in the standby mode, but flip-flop DL stays set. The next call finds flip-flop DL set, causes operate flip-flop OP to set immediately. As the ring detector flip-flop RDA will set and latch on falling edge of the first new ring detector response, the temporary presence of a reset signal from DL prior to latching is immaterial, as RDA did reset on leading edge, when DL was set, and persistence of the reset signal has no effect.

It can thus be seen that no call transfer takes place if and as long as the telephone is promptly answered in the standby mode; otherwise, the unit shifts to the operate mode and the answering service is called by the system.

CALL BACK

The system, particularly if used to transfer a call to a telephone answering service, includes a unit 70 which has the following purpose. There is provided a message flip-flop MS having its set side input controlled through a gate 71 which is assumed to be normally enabled. The trigger pulse for setting the flip-flop MS is derived from the phase and address counter 53, in particular as a phase signal at the end of transmitting dialing pulses or at the end of transmitting the ID code. Thus, as counter 53 shifts into a new state after dial-out, the message flip-flop is set to turn on a message light 72. This light is visibly disposed on the outer panel of the system. If the user returns he can ascertain whether, in fact, there was at least one call which had been transferred while he was absent. He will then wish to call the answering service to ascertain details of that call. On the other hand, if the message light 72 is not on, he does not have to bother.

In order to facilitate the call back operation, there is provided a call back switch 73. Operating this switch by the user initiates a dial-out just as in case of transferring an incoming call, i.e., the user does not have to dial the number of the answering service. In particular, the switch provides an alternative input for detector flip-flop RDA, there is, of course, no response of ring detector 11 at that point.

The call back switch 73 has still other functions: As it is operated, it force resets flip-flop DL. Furthermore, the switch 73 provides a set signal for the flip-flop OP. The user may have reset flip-flop OP already to establish the standby mode and a trigger signal for switch 73 sets the operate mode flip-flop OP again. There may be capacitive coupling between mode switch 41 and the reset input of flip-flop OP so that there is no overriding reset input for the flip-flop OP.

Therefore, upon operating switch 73 dial-out to the answering service will proceed just as if there is an incoming call. However, the user has to use the receiver of telephone TB. In case of a call back operation, there is, however, this difference. The message flip-flop MS is turned off by closing switch 73 and lamp 72 extinguishes therewith. The message flip-flop, when in the reset state, provides an inhibiting input to the relay driver gate 12 for the A relay so that at the end of the automatic dial-out of the call back operation the A relay does not close. This, of course, is correct because there is no incoming call through line A. During call transfer of an incoming call, message flip-flop MS is being set at the end of dial-out and A relay driver gate 12 is enabled in this situation for closing.

Finally, operation of call back switch 73 sets a call back flip-flop CB which disables the gate 71 thereafter, so that the now ensuing, outgoing call to be made by the unit in behalf of the user is not registered as an incoming message. The setting of the call back flip-flop has also the effect that the phase advance counter skips the conversation monitoring phase after completion of dial-out and of transmission of the ID code. Instead, the terminating signal IAM is produced to reset flip-flop RDA and to open A and B relays. As the subscriber uses the telephone TB, resetting of the entire unit is quite in order at that time. It should be noted in particular that reopening of the B relay, even before the user takes off the receiver of telephone TB to converse with the answering service, does not interrupt the connection because the answering service has answered and closing of the circuit of the calling party does not interrupt the connection.

It can thus be seen that by means of rather simple circuit additions to the overall system the simple turning off operation of message light is used to initiate an automatic dial operation directly.

MEMORY PROGRAMMING (LOCAL)

The embodiment as described thus far was particularly designed for and has been described with reference to call transfer for switching an incoming call to an answering service. Hence, calls are being transferred always by dialing out the same number, namely, to reach the answering service. Therefore, memory 60 can be prewired and hardware programmed whereby in particular each memory location holds the same particular bit combination defining one digit of the number to be dialed out in the format described.

As shown in FIG. 6 the hardwired memory may include lines 601 through 610, each one in representation of a decimal number. Output lines selectively connect to output gates 611, 612, 613 and 614, for reencoding the decimal numbers as represented by signals in lines 601–610 (one at a time) to assume binary format. The four bus gates 611 to 614 have four outputs constituting the bus system 61 which lead to the transfer gates 65 as was described with reference to FIG. 1. The memory address decoder 56 includes gates respectively enabled in response to the counter states associated with memory addresses. The output of any such gate can be regarded as a storage location of the memory and is connected to that line 601–610 representing the decimal number to be regarded as stored in the location represented by the address number causing the gate to respond.

The lines 601 to 610 may normally be kept at one potential representing bit value "zero," while response of an address decoder gate as connected to a line changes the potential to a value representing bit value "one." The connection between the decoder outputs and the lines 601 and 610 may be adjustable, but for and during operation of the system they are regarded as permanent physical connection.

For a more sophisticated call transfer system the number held in memory should be susceptible to variations. This is shown in FIG. 2. FIG. 2 is, in fact, a modification of FIG. 1, but the unmodified portions thereof can readily be incorporated, particularly sections 10, 40 and 70. For purposes of programming memory 60 has storage locations, such as memory cores registers on recirculating delay lines of conventional design, and which can be loaded through control of electrical signals. For reasons of simplicity, one type of storage facility will be described, and it is assumed that each bit location is defined by a particular ferrite core. Four cores define a particular depth location and are concurrently addressable. As an address is decoded by circuit 56 the four cores of the addressed locations are forced to assume "zero" state. These four cores are coupled to four sense wires leading to the four lines of bus 61. Those cores which held a "one" induce a pulse in the respective sense wire for feeding such pulse into the respective line of bus 61 for passage to the respective stage in counter 62 through the open gate 65.

As the readout process is destructive, such a memory needs a restore cycle to write the readout data back into the memory. A memory control circuit 67 responds to the trailing edge of the transfer output of gate 64 to generate a control pulse for another set of gates, 68, causing the extent of counter register 62 to be written back into the memory before incrementation for counting begins.

It should be mentioned in this connection that the necessary timing for a core memory read-read-restore cycle is short in comparison with each of the periods T0, T1 or T2 employed in the operation. The counter 62 changes state only upon the falling edge of the pulse T1 so that actually the entire period T0–T1 after loading of counter 62 is available for read-restore which is much longer than needed.

It is apparent that utilization of a core memory does not change at all system operation particularly during dial-out, call back, etc. However, a core memory must initially be loaded. Such initial loading or programming suffices for call transfer to an answering service. However, the essential advantage of a core memory or register memory etc. is the fact that its content can be changed by electrical signals. Programming of the memory can be carried out in two ways, local or remote. Types of system units can be designed so that implementation for one, or the other, or both, programming ways is provided.

Proceeding first with description of local programming, the system includes an input jack 81 for plugging in, for example, telephone TA or TB, disconnected from its normal connection for that purpose. The system is provided with a program switch 84 which, when closed, sets a programming flip-flop PF. The output of that flip-flop, when set, may be used to inhibit the output of ring detector 11 from operating the call diversion circuit to avoid that an incoming call interferes with the operation of memory loading. In the alternative, the user can shift the system into the standby mode which also inhibits immediate call transfer at that time.

A telephone plugged in in jack 81 is now used for dialing into the system the number to be dialed out for call switching. Telephone TB, for example, may be unplugged and connected to jack 81. The subscriber-reprogrammer thus begins to dial the number to be stored. As he dials, pulses appear in line 82, which connects jack 81 to a second input for counter 62. The several stages of the counter 62 have a second interconnect logic for causing the counter to subtract from its respective content in response to pulses received by the interconnect logic through line 82.

The dialing-in of digits is monitored by a circuit 83 which discriminates between dial pulse sequences and pauses separating such sequences which represent different digits of the telephone number dialed in. Circuit 83 can be regarded as a combination of reset integrator and Schmitt trigger. The Schmitt trigger is normally set. Each dial pulse resets the integrator which, in turn, resets the Schmitt trigger. For normal dial pulse sequences the integrator never reaches the trigger level of the Schmitt trigger included in circuit 83, so that the latter stays reset during dialing.

After a dial pulse sequence is terminated, the pause elapsing causes the Schmitt trigger to set again, and detector circuit 83 provides an output signal accordingly. With the next dial pulse, it will be reset again, etc. Therefore, for a pause between the dialing of two digits, the circuit 83 provides an enabling signal and the same signal is present prior to dialing.

The reset state of detector 83 can be employed to enable the logic in counter 62 to provide subtraction. A change from the set state of circuit 83, as established by the set state of its Schmitt trigger, to the reset state occurs at the leading edge of the first dial pulse after a pause. That change forces counter 62 into a count state of number N. Subsequent dialing of the first telephone number digit decrements the number N in counter 62 by the number of pulses dialed in. In particular, the trailing edge of each dial pulse causes the counter to decrement by one unit. Concurrently the set state of program flip-flop PF inhibits pulses T1 from incrementing the counter 62 during the programming (gate 69). Therefore, after a decimal digit has been dialed, the counter 62 holds the N's complement of the dialed-in number.

The leading edge of the set state output of dial sequence-pause detector 83, when detecting a pause, is used to force phase advance control 52 into a state for advancing phase counter 53, of course, in phase synchronism with the T0–T1 timing cycles. This places counter 53 into a state for addressing the first memory location. As there is neither a dial tone, nor any other input, the phase counter must thus be operated from and by the programming operation itself. Thus, at the end of dial-in of the first digit, counter 53 prepares the first memory location to receive the N's complement of the dialed in number as now available in counter 62. Control gate 64 is operated as usual during phase counter operation and controls also the memory control circuit 67, here to effect transfer of the current content of counter 62 into the addressed memory location. Thus, there is a record operation as during read-restore. The output of program flip-flop PF when set is used to inhibit gates 65 so that there is no memory read phase during reprogramming, as that would interfere with the content of counter 62.

After a dial pause the first dial pulses of the next digit will arrive. The leading edge of the first dial pulse resets pause-detector 83 and the resulting signal edge of the detector output when resetting causes again the counter 62 to reload number N. Subsequently counter 62 is decremented on trailing edge of each dial pulse. New dial pulses will now arrive, decrement the content of counter 62 and as sequence pause or dial-gap is detected, the decremented number is loaded into a new location, etc.

Finally the new number dialed in has been properly processed and the advance counter 53 stays at the last address. The user may have been instructed (a) to open switch 84 so that the program flip-flop resets, and (b) to dial in any last digit at the end as a simple way of causing detector 83 to respond anew and to trigger the advance control 52 so that counter 53 shifts into the next counter state which is empty. As a result, the memory will now read out "zero" and the advance control will operate counter 53 until the conversation phase has been reached. Any additional memory locations addressed will either hold zeros or superfluous numbers. In either case, as soon as the program flip-flop is reset, the memory addressing and phase advance becomes self-advancing whenever count state zero has been reached by counter register 62.

This is similar to dial-out. That there are dial pulses produced is totally irrelevant and B relay gate 22 is disabled during reprogramming.

An AND-OR gate 86 assembly provides an input for the B relay driver which is an alternative input to the output of driver gate 22 to close the B relay during conversation mode when arrived at by phase counter 53. The line 532 provides the input for this relay closing operation, as line 532 derives a true output from the phase counter during the conversation phase. For normal, dial diverting operation this alternative input for the B relay driver is a redundancy because the system can arrive at that mode only during call diversion when the RDA flip-flop is set. Closing of B relay will invoke a dial tone in the system. It will be recalled that dial tone detection during the conversation phase shifts the system into the inactive phase. The same holds true for the particular waiting phase between dial out and ID readout which can now be bridged in the same manner.

Dial tone detection at this point shifts the system into the reset state in that the phase counter produces output IAM. However, the conversation phase signal line 532 is needed to gate dial tone detection into advance control 52 as gate 51 is disabled during programming. Again, for normal call diversion this is a redundancy.

For local reprogramming as described, it is clearly more convenient to use line B for passing information into the system, as any call coming in through line A leads automatically to dial-out and call-diversion. However, to proceed in this manner is not inherently necessary. Assuming that all calls are made through line A, call switching may briefly be deferred and the system connects briefly the tone detector 35 or the demodulator 87 to line A. If dial pulses do come in the system shifts to a reprogramming sequence; if not, the incoming call is diverted.

MEMORY PROGRAMMING (REMOTE)

Remote programming is provided for in those cases where the user may wish to change the number in memory from a remote location. For example, he may be absent from his office, but can be reached at a first location the number of which is held in memory for transfer of calls to that first location. He now intends to leave for a second location without first returning to the office. Therefore, he will want to change the telephone number in his system's memory to that of the second location. Circuitry of FIG. 2, not yet described, serves also as supplement of the circuit shown in FIG. 1 to permit the remote programming.

The user of the system dials from the remote location the number of his line B, and a ringing signal will thus appear on line B. It will be recalled that this in an unlisted number known only to him and this line B is thus available for inputting reprogramming data. Thus, there is provided another ring detector 21 connected to line B. As the call comes in line B, the ring detector 21 responds and sets a ring detector flip-flop RDB. The set state of ring detector flip-flop RDB is another input for gate assembly 86 to control B relay driver 23 so as to close the B relay.

The oscillator 38 which provides the carrier for dial-out, is used as response indicator. A gate 371 provides through an OR configuration an enabling signal to oscillator 38 serving in the alternative to gate 37. Gate 371 is enabled by the ring detector flip-flop RDB and receives additionally the phase signal in line 533 derived from the phase counter 53 after a call has come in. Therefore, oscillator 38 provides now an audible signal which the reprogrammer hears through line B at this remote location. Therefore, he knows that his unit has responded.

There will, of course, be no dial tone coming in through line D, so that the dial tone detector 35 does not respond. Accordingly, the phase advance control input gate 51 is not enabled. The output of flip-flop RDB enables gate 85 controlling an alternative input to line 82 and detector 83. Moreover, ring detector flip-flop RDB sets programming control flip-flop PF. The phase advance control 52 is also enabled to advance, but in this case by control of flip-flop RDB via detector 83 when set.

Two modes of reprogramming will be described with reference to FIG. 2. If after communication has been established the programmer just dials in digits, the circuit interruptions produced result in large transient spikes coming into the unit through line B. These transient spikes have amplitude far in excess of regular communication signals, or even noise. Therefore, for this embodiment an amplitude detector discriminator is connected across line B, for example, across the secondary 33 of transformer TRB, producing an output signal for each detected transient in representation of a dial pulse. For this situation detector 87 is to be interpreted as amplitude discriminator.

An alternative mode of sending dial pulses into the unit requires the reprogrammer to have a particular instrument 80 which will be described later in greater detail with reference to FIG. 7. With this he is capable of sending sound pulses of particular frequency into the telephone line at the remote location and at the rate of regular dial pulses to simulate dial-in. This dial simulator is used by him to dial the number he wishes to have inserted in memory 60. The dial pulses are received by the system and particularly applied to the detector 87. In this case detector 87 is a tuned circuit.

Regardless of the type or detector used and dial pulse transmission used, detector 87 can be inserted permanently in the system, but it can also be assumed that it is enabled or turned on by flip-flop RDB. The detector 87 has a rectifier output and, therefore, applies the dial pulses as logic pulses to enabled gate 85. As was stated above, the output of gate 85 feeds counter 62, as well as dial-pulse-pause detector 83, to place the counter into the subtract mode. The memory is now loaded just as in case of local programming.

After the new number has been dialed in, the phase advance counter will arrive at the location in which the system monitors the dial tone. However, the following point should be interjected here. Generally, the memory should be designed to permit accomodation of any enlargement in the number of telephone number digits should that accor. However, for remote reprogramming the memory should be designed that after the last digit has been dialed in, the next count state of the phase counter reached by dialing in a superfluous digit is the conversation mode. The reason for this is that it may be inconvenient to design the system for a remote controlled resetting of the program flip-flop. It was that resetting which in case of local programming enabled the phase counter system to self-advance until reaching the conversation phase. The decoder 56 of the program counter may be provided with a switch bridging those outputs defining muted locations and connecting them to line 532 so that always at the first empty location is equivalent to arrival at the conversation phase.

There is another difference from local programming as the line B is used in the remote program mode and relay B is already closed. In order to evoke the production of the dial tone after the reprogramming call through line B has been completed, it is necessary to temporarily interrupt line.

It should be observed that the dial tone detector 35 and timer 42 respond to signals in the transmission link in exactly the same way as during call switching operations. Now, as the counter 53 has advanced to the conversation mode, the signal level in the transmission section 30 is monitored as usual. Since there is no conversation in progress after the dial in, timer 42 will respond very soon. Normally, line A is checked, but line A is open. Thus, for this reason the output of timer 42 is also coupled to the input of a gate 88 which provides the programming alternative signals to gate assembly 86, directly operating the B relay driver 23. This operative connection depends on the set state of the B line ring detector flip-flop RDB or the conversation phase and a pulse from timer 42 will temporarily open and reclose the B relay to evoke dial tone if not already on the line (as will be the case of local programming).

Normally, i.e., during a normal call transfer operation a call is switched over from line A to line B and line B is equivalent to the line of a calling party; in this case a temporary opening of the relay B would be of no avail. In the present situation, a call came in to the unit through line B, which now is equivalent to a called party, so that interruption thereof in effect evokes dial tone if the reprogrammer who had called in through line B, has hung up. Evoking of dial tone in the conversation phase returns the system to the inactive phase, as usual. In particular, the signal IAM turns off both, flip-flop RDB and PF. The remote reprogramming mode is, of course, applicable also at the unit itself. The user can simply call his line B through his own line telephone TA and proceed from there as if he were at a remote location.

Another form of programming relates to the fact that so-called touch-tone equipment becomes more widely used. The programmer calling his unit via line B from a remote location uses either touch-tone equipment at that location or a unit shown in FIG. 7*a* and explained below.

In either case, after communication has been established the programmer sends into the line dial signals wherein each digit is represented by a composite having two particular frequencies, selected from seven different frequencies. A digit is thus defined by a two-out-of-seven code, represented by two different frequencies. The reprogramming control portion of the call switching unit is constructed as shown in FIG. 2*a*.

After the ring detector flip-flop RDB has been set in response to the incoming call for reprogramming those touch-tone signals are received in the unit and decoded by a frequency selective circuit 871 which has seven tuned circuits and provides one particular output per each pair of frequencies contained in a dial-in-signal. After reception of such a signal, pause detector 83 responds. In addition, the output of detector circuit 871 is reencoded by an encoder 872 providing already the complement excess-N code needed for direct storage. The output of the pause of interdigit time detector 83 enables a set of four parallel transfer gates to load read-in register 68 from which data are transferred to the addressed memory location. Addressing is controlled from the output of detector 83 via the phase counter 56 as aforedescribed.

A modification of the basic system is derivable from the foregoing description. In lieu of counting out and sending out dial pulses during dial out, one can use a decoder and reencoder coupled to register 62 which always received the bit combination defining a digit of the number to be dialed out. Decoding and reencoding may produce setting two-out-of-seven frequencies into line B for touch-tone type dial out.

COMPONENTS a. Remote Dialer—Regular

Turning now to the description of FIG. 7, there is illustrated more particularly the instrument 80 used to dial-in numbers for reprogramming of the call switching system in the remote program mode. The same unit can be used for a so-called dial-through operation to be described below. The unit 80 includes a suitable housing (not illustrated) designed for easy handling and for mounting of the circuit elements illustrated. The unit has a regular telephone dial 801 as indicated schematically. Dial unit 80 is of usual construction as is conventional for operation of telephone dials and particularly as far as accuracy of timing of dial pulses and dial pulse pauses is concerned.

The output of dial 801 operates a contact blade 802 which is normally closed, but opened in response to each dial pulse and for the respective duration thereof. Switch 802 is effective to short-circuit a capacitor 803 for rapid discharge thereof. As long as contact 802 is open, capacitor 803 can recharge through a very accurately determined, temperature insensitive resistor 804, connected in series with a small trimmer potentiometer 805. The elements 803, 804 and 805 provide a series RC circuit connected between ground or a source of negative potential and B+, which is a local source of power supply, such as a battery, for unit 80.

When contact 802 is open, capacitor 803 charges to a value which is equal to the firing voltage of a unijunction transistor 806. Transistor 806, when conductive, causes the capacitor 803 to discharge through a resistor 807. Therefore, as long as contact 802 is open, the circuit establishes a simple timing circuit in the form of a relaxation oscillator, oscillating at 1.5 kc. If switch 802 closes, or is closed, as is normally the case, and which is particularly the case in between dial pulses, capacitor 803 is discharged and the gate electrode of unijunction transistor 806 is clamped to ground so that the transistor cannot fire. The relaxation oscillator thus provided a 1.5 kc carrier wave and the dial, pulse-modulates that wave.

The output pulse-modulated carrier signal as provided by the unijunction transistor 806 controls a power transistor 808, connecting B+ to the energizing coil 809 for a sound transducer 810. The transducer 810 is selected in a manner which is peculiar as to loudspeaker-type transducers. The transducer coil 809 is ohmic at the desired frequency of 1.5 kc having, therefore, a low Q and exhibiting electromechanical resonance for the frequency of interest. For frequencies above the resonance frequency, coil 809 is more inductive, for lower frequency the coil is more capacitive. As a consequence, the coil acts as attenuator for signals other than the desired frequency.

It follows from the forgoing that upon dialing with dial 801, bursts of 1.5 kc waves issue from the transducer 80 at dial pulse rate. Each burst at the desired frequency lasts for the duration of a dial pulse, as determined by inherent operation of dial 801. As he dials, the remote reprogrammer holds this unit to the receiver of the telephone he uses to communicate with his unit, line B. Thus, the pulses and wave bursts are now transmitted. As described above, the tuned circuit 87, in FIG. 2, responds to pulses at that frequency when coming in through line B, demodulates such pulse and feeds them as counting pulses into the memory loading register 62.

b. Remote Dialer —Touch Tone

Thus the unit illustrated schematically in FIG. 7*a* permits touch-tone reprogramming, if the reprogramming input section of the call switching unit accepts two-out-of-seven frequencies per digit such as was explained above with reference to FIG. 2*a*.

The transmitter illustrated in FIG. 7a has a keyboard 820 arranged in a matrix to operate a switch bar system of conventional design, there being four row switches and three column switches. The keys of the same row when pressed connect one and the same resistor of a plurality of four different resistors 821 to a voltage source B+, the remaining three registers remain grounded. As a capacitor 823 charges through the connected one of the resistors, the resulting voltage across capacitor 823 soon renders a unijunction transistor 822 conductive causing capacitor 823 to discharge, which renders unijunction 822 nonconductive etc. The resulting oscillatory output of unijunction 822 has a characteristic frequency determined by capacitor 823 as well as by the particular resistor placed in circuit. One half of an output section 830 of this transmitter unit is connected to unijunction transistor 822 to supply an oscillation signal to a loudspeaker 831, the latter providing a corresponding audio signal accordingly.

Any key when pressed actuates also a column switch, and either one of the four keys in one column when pressed connect one out of three resistors 824 in circuit with a capacitor 825 controlling a unijunction 826 which in turn provides oscillations to the other half of output section 830. Accordingly, a second tone is transmitted by loudspeaker 831. Proper dimensioning of capacitors 823 and 825 and of the seven resistors 821 and 824 establishes seven different frequencies, and for each key that is pressed two out of these seven frequencies are applied to output section 830 for two-tone audio transmission by speaker 831.

c. Ring Detector

Proceeding now to the description of FIG. 3, there is illustrated a preferred embodiment for the ring detectors 11 and 21. The equipment should be designed to be adaptable to various ringing conditions and ringing frequencies. In particular, the ringing frequencies can vary over a wide range, but the ring detector should be designed to respond to all possible ringing signals. On the other hand, the ring detector must be designed so that it discriminates ringing against signals as they occur during normal communications such as speech signals. However, the ring detector must also discriminate against dial pulses.

It should be observed here that, on one hand, ring signal frequencies can be as low as 16 ⅔ cps, while dial pulses can be as high as 10 cps at voltages in the same range as the ringing signal voltages. Moreover, telephone lines may often have a high voltage common mode signal particularly against ground, having frequency and/or amplitude comparable to frequency amplitude of the ringing signal. The circuit shown in FIG. 3 is designed to meet all these various problems.

There is provided a neon bulb-like tube 110 which is filled with a radioactive gas having a firing voltage, for example, between 70 and 80 volts. Such a bulb can be overloaded. The ringing signal is applied to the bulb 110 through a 150 k ohm resistor 111. The series circuit of elements 110 and 111 is connected to telephone line A (or B). The bulb will fire near the peak of each ringing signal oscillation wave but also on other signals, provided they exceed the firing level. Nevertheless, amplitude discrimination as between conversation signals and other low amplitude noise in the lines to which the detector is connected is readily obtained. On the other hand, common mode signals will never cause bulb 110 to fire because the bulb is not grounded. Hence, that part of the detector floats as to ground.

Bulb 110 is contained in a housing 112 which is light-tight and which also includes a photoelectric detector 113, such as a cadmium selenide cell; such a cell has a sufficiently fast response. Photoelectric detector 113 is connected with one end to a voltage source B+ of, for example, +12 v, and is connected in series with an adjustable resistor 114 providing power dissipation in case of overload. Resistor 114 connects cell 113 to a large capacitor 115, which is grounded at the respective other end and serves as an integrating capacitor.

It follows that for each half wave bulb 110 fires, current flows through the illuminated detector 113 into the capacitor 115. As the luminous output of bulb 110 is essentially independent from the firing voltage, the current pulses through detector 113 operating as charge pulses for capacitor 115 have essentially constant height. However, the duration of such charge pulses is to some extent frequency dependent and, of course, the repetition rate of such pulses is exactly in proportion to the frequency of the bulb firing signal, be it a ringing signal, a plurality of noise peaks, or a dial pulse sequence.

A relatively small resistor 116 is connected across capacitor 115, causing the capacitor to discharge at a particular rate. It must now be observed that a dial pulse sequence has a maximum of ten dial pulses and such a sequence is necessarily followed by a pause which is larger than the pause between two dial pulses. Resistor 116 is now selected in relation to capacitor 115, in that a maximum of 10 dial pulses cannot possibly charge the capacitor 115 to a particular level. After 10 dial pulses (or less), there is a pause during which capacitor 115 will lose some or most of its charge through resistor 116. Another sequence of ten dial pulses will not cause augmentation of the charge of capacitor 115 up to a critical level.

The junction of resistors 114, 116 and of capacitor 115 is connected to the control electrode of a unijunction transistor 117, connected between B+ and ground by means of resistors to bias the transistors to an input threshold response level for firing above that capacitor voltage obtainable even in case of repeatedly dialing of the number zero (producing ten dial pulses). On the other hand, a ringing signal includes always more than 10 waves of whatever ringing frequency is being applied. Therefore, a ringing signal having duration only a little longer than one-tenth second regardless of frequency (even as low as 10 cps) suffices to charge capacitor 115 up to the trigger level of unijunction transistor 117. The output of one of the main electrodes of unijunction transistor 117 is the output proper of the ring detector. As stated above, it can be used to set, for example, flip-flop RDA or RDB in order to store as information the fact that the ring detector has responded.

As stated, speech signals are below the firing level of tube 110. The dial tone likewise is normally below the response level of the tube 110, and noise peaks, even strong ones, do not occur with sufficient regularity to establish the sufficient number of charge pulses at minimum rate for capacitor 115. It should be noted that the constant current characteristics of neon bulb 110 prevents high noise peaks from causing excessive charges of the capacitor.

d. (Dial)Tone Detector

The dial tone detector 35 is illustrated in FIG. 4 in greater detail. The principal function of the dial tone detector is given by its name, but, of course, the essential aspect of that function is to discriminate against speech, noise, music, etc. It has to be observed that the dial tone signals are within the audible range at amplitudes equivalent to loud speech. The dial tone has normally amplitudes well below other noise signals or ringing signals which may appear across the line. It is, therefore, a specific object of the circuit shown in FIG. 4 to sort out the dial tones with certainty from signals having similar, higher or lower amplitude and comparable frequency ranges. The principal feature used for discrimination is persistence above a particular amplitude level.

The function of the dial tone detector within the system of FIG. 2 was explained above so that its importance within the system does not have to be repeated. The dial tone detector essentially has two parts, a level detector and a timing unit. The output of the former provides the output signal in line 366 as conversation monitor to reset timer 42. The output of the timing unit in detector 35 is the output proper dial tone detector (line 365).

The input line 350 of dial tone detector 351 is shunted by a clipping diode 351 which removes all noise peaks above clipping level, and thus limits the signal before processed further. An integrator comprised of a preamplifier 352, a capacitor 353, rectifier 354, and a shunt resistor 355 is connected to the line 351 to integrate clipped half-waves of audio signals as applied to that line. The integrator is adjusted to integrate specifically the low frequency component of the dial tone, but also of speech. It is known that the dial tone is a composite one, but there is one predominant low frequency component at a frequency of The integrator output is connected to a Schmitt trigger 356, having a particular response level requiring the output of the integrator to remain above a particular level. The time constant of the integrator is rather short so that the envelope of the a-c signal applied to input line 350 must remain persistently above the particular level corresponding to a rather loud persistent audio signal, such as in case of a dial tone. The circuit 351 to 355, however, is not a mere envelope detector, but has sufficiently long time constant to filter out short, isolated bursts of (usually noise) signals.

During normal conversation on line 350, i.e., during normal conversation through the coupling section 30 in FIG. 1, Schmitt trigger 356 will be triggered, though irregularly frequent, and will stay at the upper output level only for short periods of time. In particular, Schmitt trigger 356 will drop its output to the lower level as soon as capacitor 353 of the integrator discharges, at least to some extent through the rather low resistor 354. The output of Schmitt trigger 356 is used as an indication that speech or other communication is present. The output line 366 of the communication monitoring part of detector 35, and used extensively in the system, as described, connects to Schmitt trigger 356.

The output of Schmitt trigger 356 controls conduction of current through a shunting transistor 357 connected across a capacitor 358. Schmitt trigger 356 is at the upper level upon signal envelope detection by the integrator of sufficient strength and this in turn causes transistor 357 to be nonconductive. Transistor 357 is conductive and actually short-circuits the capacitor 358 when there are no "tones" in line 350. A resistor 359 connects capacitor 358 to a voltage source B+, the other end or electrode of the capacitor being grounded; capacitor 358 is thus permitted to charge when the Schmitt trigger is on the upper level.

The time constant of the RC network as established by the series circuit of capacitor 358 and of resistor 359 is selected so that a particular charge level is reached only after ten seconds or thereabouts. When that level is reached, a unijunction transistor 360 is fired. A load resistor 361 is connected in series with transistor 360 and a voltage drop across resistor 361 is an output signal of the dial tone detector. Thus, output line 365 connects to the junction of transistor 360 and of resistor 361.

It will be appreciated that a high amplitude of the audio signal in line 350 has to persist for 10 seconds (or any particularly adjusted period of time) during which Schmitt trigger 356 remains consistently at the upper level to turn transistor 357 off throughout that period so that the capacitor 358 can charge up to the firing level of unijunction transistor 360. Experience has shown that such a persistent audio signal is effective in the telephone line only if it is a dial tone. Even seemingly persistent loud speech does not have a persistently high amplitude envelope to uninterruptedly maintain Schmitt trigger 356 in the energized (upper level) state; even music is never sustained at sufficient high amplitude for the critical duration required before unijunction 360 is permitted to fire. It should be noted that there is no reason not to extend that period of persistence to distinguish the dial tone from other sound, but ten seconds were found to be sufficient. It follows, therefore, that only a dial tone on line 350 will cause unijunction 360 to fire to produce an output signal in line 365 indicative of dial tone detection.

In order to shorten overall operation, the time constant for the RC network controlling firing of unijunction 360 can be lowered, particularly in those cases where neither speech nor music nor any other communication signal is on the line, at least not at sufficient amplitude. This will be the case during the initial phase of operation, after a call has come in through line A, and after the B relay has closed; a dial tone has to be detected before the operation can proceed. As conversation has not yet taken place, speech signal cannot be on line B as line B is still decoupled from line A at that time. Noise which may occur on line B, such as cross talk, has insufficient amplitude regardless of frequency to cause dial tone detector to respond. Therefore, it is not necessary to monitor the persistence of a particular signal for ten seconds but a considerably shorter period suffices.

As symbolically indicated by FIG. 4, the conversation phase operation signal as derived via line 532 from phase counter 53 is applied as control signal to the detector through a signal isolation amplifier 364, possibly operating as NOR gate to respond to different phases. During the conversation phase, isolation circuit 364 provides B+ to a capacitor 363, its other end is kept floating with the potential of the junction of resistor 359 and of capacitor 358. Under these conditions, capacitor 363 does not influence the time constant of the RC circuit 358–359.

During the other phases, particularly initially when the system waits for dial tone, isolation circuit 364 applies ground to capacitor 363 and the capacitor 363 charges in unison with capacitor 368. The parameters are chosen, that capacitors 363 and 358 together reach firing voltage of unijunction transistor 360 after about one second charge time. Thus, Schmitt trigger 356 needs to be nonconductive only for one second before an output is produced across output resistor 361.

It follows that dial tone needs to persist for 1 second only at the beginning of operation, when there is no conversation, i.e., prior to dial out after closing of B relay. During conversation, after dial out, when both relays, A and B, are closed, the distinction to be made from conversation requires longer persistence of dial tone at about constant amplitude, and here the longer time constant is operative in that the conversation phase signal in line 532 decouples capacitor 363 from the system.

e. Repeater

FIG. 5 illustrates the repeater amplifier 31 in greater detail. The repeater amplifier is provided in order to compensate the loss incurred by the fact that by operation of the call transfer unit, each incoming call is run through the telephone exchange twice. FIG. 5 also shows the two transformers TRA and TRB, respectively coupled to line A and line B. It is a function of the repeater amplifier to transfer signals from line A to line B, as well as from line B to line A, on a time-sharing basis and to thereby boost the signals both ways without producing ringing.

The repeater amplifier has two sections 310 and 310*a* which are identical in design, only one thereof is shown in greater detail. It is a function of each section to transmit signals from one transformer (TRA or TRB) to the other one, and to inhibit transmission of a signal which has been already transmitted by the respective other section, back from the other transformer to the first mentioned one. In particular, section 710 is to transmit signals from line A and developed across winding 32 as secondary of transformer TRA, to transformer TRB for further transmission into line B, while section 310*a* transmits signals from line B to line A using the same transformers. Section 310 is designed to inhibit retransmission of the output signal of section 310*a*, back to transformer TRB, and section 310*a* inhibits the corresponding retransmission to transformer TRA.

Winding 32 is connected in series with a winding 320 serving as input for a transformer TRa having a compensating network 321 as load. The network has an impedance at least approximately matching the impedance line A has in relation to the system. Analogously, there is a transformer TRb with a load 322 serving as compensating network for line B.

The following will be assumed and verified later. Point *a*, which is the output of section 310*a* is maintained very close to ground potential as base line potential for ac outputs of section 310*a* and particularly within the operating range of frequencies (which is the pass band of the telephone system). Analogously, point *b* has ground potential as to a.c. developed by section 310 as output thereof. As can be seen, the side of winding 32 not connected to winding 320 is grounded directly, and an analogous situation exists as far as point *b* and winding 33 is concerned.

Thus, a signal from line A and developed across transformer 32 can be regarded as developed in parallel across winding 320. A signal developed in point *a* as the output of section 310*a* is serially developed across windings 32 and 320, and since the compensating network 321 is a load for transformer TR*a* having the same independence as has line A for transformer TRA, the signal is in fact divided by two, each half developed serially across windings 32 and 320, respectively. Therefore, and using the junction of windings 32 and 320 as reference, the signal from line A as divided among winding 32 and 320 has the two resulting components in phase while corresponding components of the signal driven by section 310a to point *a* are out of phase across these windings.

As a consequence of the foregoing, input terminal 313 of amplifier 312 receives (relative to ground) the signal from line A as developed across winding 32. It receives the same signal again as it is developed across parallel windings 320 (point *a* appearing grounded) and via unity gain amplifier 311 superimposing the two signals in phase at input 313 for amplifier 312.

The signals developed by section 310a at point *a* is divided by series windings 320 and 32, one half of the signal is applied to input 313 directly and the other half appears thereat with inverted phase but of equal amplitude, because amplifier 311 has unity gain. Thus, that signal from section 310*a* is cancelled at the input 313 of amplifier 312.

Amplifier 312 has a gain larger than unity. The minimum gain is 2, as the signal supplied ultimately to point *b* is halved by the transformers TR*b*–TRB. Higher gain, of course, is needed if the repeater is to fulfill its function namely to offset losses resulting from routing telephone calls to be transferred through the unit twice through telephone exchanges. The output of amplifier 312 is, however, not directly applied to point b; instead an active filter 314 is interposed. Filter 314 has peak transmission at a frequency which is near the upper limit of the telephone transmission band. The purpose of this filter is to offset same mismatch of the compensating network 321 for lower frequencies.

The output of filter 314 is passed to a current amplifier 315 for impedance change. As a consequence point *b* is operated at or near ground as ac base line. It will be recalled, that this was assumed above, particularly with regard to point *a*, the situation, of course, being analogous at point *b* due to identity in design of sections 310*a* and 310.

DIAL THROUGH

Inherently, the system, particularly when supplemented for remote programming, permits the following operation. For example, the user wishes to make a long distance call from a location outside of his office, but for reasons of the charge he does not want to burden the telephone subscriber at his present whereabouts. Or he may be at a pay-phone, short of sufficient coins; he can proceed as follows: He phones his office, via line B, and reprograms his unit with the long distance number. He then calls his office via line A and the unit will automatically dial out via line B. After completion of the long distance call, he again calls his line B and reprograms the unit for regular call transfer. This requires three local calls. The supplemental circuit shown in FIG. 8 simplifies this procedure as it obviates the temporary reprogramming.

As mentioned in the introduction, the system may include provisions for a so-called dial-through operation. This provision is optional but can readily be included in the system of FIGS. 1 or 2. The circuit shown in FIG. 8 particularly supplements the answering service unit without remote programming capabilities. However, a unit shown in FIG. 7 should be used.

The subscriber who wishes to make a long distance call, with toll or long distance charges against his office, dials his office but through dialing the number of his line B. A ring detector 21 (not needed normally in the system of FIG. 1 ) responds and sets ring detector flip-flop RDB which enables both, A and B relay driver gates 12 and 22 so that relays A and B close. The user will now hear a dial tone. However, the phase counter 53 has not been advanced so that reception of a dial tone has no bearing on the unit. A control flip-flop CF is normally reset and through an output gate 93 inhibits response of ring detector 35 at this time from retiring the system to the inactive state.

The system includes also the tuned circuit 87, the output of which controls an inhibitor gate 91 for the input to A relay driver gate 12. After having called his office via the telephone number of his line B, the user has, in fact, established connection to line A through his unit, just as if he had lifted the receiver of his telephone TA and he will hear a dial tone. He now places the instrument 80 next to the microphone of the receiver of the telephone he is using and dials into that receiver the long distance number he wishes to dial-out. The dial pulses pass through the telephone exchange into the line B and are decoded by tuned circuit 87 to establish disabling pulses for gate 91 which, in turn, disables the A relay driver gate 12 to open the A relay. This is equivalent to dialing out directly through the line A.

As stated, the dial tone and conversation detector 35 is permanently connected in parallel to the system and monitors the persistence or absence of conversation. Detector 35 will, therefore, reset timer 42, which has been enabled when the flip-flop RDB was set, as long as normal conversation proceeds in a similar manner as was described above. After the db level in this line has persisted below the response level of detector 35, timer 42 will be allowed to run and thereafter passes a disabling pulse to relay driver 23 via a gate 92, as line B is now the called side of the system. The output of timer 42 sets control flip-flop CF so as to enable gate 93. If the user has hung up, a dial tone will be evoked by the temporary opening of the B relay. The detection of dial tone will provide a control signal to gate 93 to turn off the B line ring detector flip-flop RDB, as well as the control flip-flop CF for deactivating the system.

If the system is to be provided with the dial-through feature, as well as for remote programming, a distinction between programming and dial-through has to be made. The circuit of FIGS. 2 and 8 can be combined by using, for example, a 10 detector coupled to the counter 62. If the user dials a zero into the system, his unit 80 actually issues ten pulses as the first digit. Detection of 10 pulses activates that part of the circuitry shown in FIG. 8 as controlled from flip-flop RDB to establish dial through conditions. If the first digit is not a 10, (no telephone number begins with a zero) reprogramming proceeds as was outlined above, with reference to FIG. 2. Finally, a simplified version may include only the elements shown in FIG. 8.

Each of the various versions of the basic system can readily be supplemented for conference calls and/or manual interconnection. For example, a secretary may answer incoming calls (line A), dials out via line B and then closes A and B relays manually. As telephone TA (and even telephone TB) are connected in parallel to the system, conditions for a conference call are established. To permit both, the circuit of FIG. 8 can be used but including additionally a manual switch to set flip-flop RDB which causes A and B relays to close. However, the circuit 87 is not needed for this operation, the remaining circuitry shown in FIG. 8 should be provided as an automatic conversation monitor to control disconnections. The systems of FIGS. 1 and 2 can be supplemented analogously.

The invention is not limited to the embodiments described above, but all changes and modifications thereof not constituting departures from the spirit and scope of the invention are intended to be included.

We claim:

1. An automatic telephone switching system for connection to two telephone lines of a subscriber, leading to a central exchange, and for switching calls coming through a first one of the lines as outgoing call of the second one of the lines comprising:

a ring detector connected to the first one of the lines and detecting persisting low audio frequency signals in the first one of the lines;

first circuit means connected to the ring detector and closing a circuit on the second line when the ring detector has responded to a ringing signal;

tone detector means connected to the second line when closed by operation of the first circuit means and responsive to the envelope of low speech frequency signals coming through the second line and having amplitude above a particular amplitude, and providing first output signals representative thereof;

integrating means connecting to the tone detector means to integrate the first output or a representation thereof, to monitor persistence of the envelope above the particular level for a predetermined period of time in representation of a dial tone as distinguished from other audio signals such as speech and producing a second output as representation of detection of a dial tone;

storage means for holding manifestations in representation of a telephone number;

second circuit means connected to the storage means and to the tone detector for feeding dial pulses in response to the manifestations in the storage means, into the second line subsequent to closing the circuit on the second line by operation of the first circuit means and in response to the second output of the integrating means;

third circuit means connected to be responsive to completion of operation of the second circuit means to interconnect the first and second lines;

the tone detector connected to be responsive to the envelope of signals transmitted through the third circuit means;

a timing circuit connected to the tone detector to be reset wich each first output signal but providing an output if not reset for a predetermined period of time, further connected to the third circuit means to briefly interrupt connection to the first line; and means connected to be responsive to the second output of the integrating means to control final disconnection of the first and second lines if dial tone is detected subsequent to operation of the third circuit by the timing circuit.

2. A system as set forth in claim 1, including means for controlling the operative duration of persistence of the monitored signal for dial tone recognition to be shorter, when monitoring dial tone subsequent to operation of the first circuit means than after operation of the third circuit means.

3. A system as set forth in claim 1, the ring detector including a circuit element connected to the first line to be responsive to signals on the line exceeding particular amplitude, and means nongalvanically coupled to the circuit element and producing pulses when the element responds, and including second integrating means for integrating pulses of a continuous sequence above the maximum number of dial pulses in a dial pulse sequence ringing detection occurring only when the number of pulses integrated in a sequence exceeds said maximum number.

4. A system as in claim 1, including a second timer connected to begin running subsequent to ring detector response and providing a temporary opening of the connection to the first line independently from the tone detector means.

5. In a system as set forth in claim 1, the first means including externally settable storage means to store manifestations of dial pulses.

6. In a system as set forth in claim 5, the first means including means providing timing signals on a repetitive basis and at particular frequency, the storage means providing signal indications in response to which the timing pulse providing means are coupled to the second line by operation of the second circuit means for providing a plurality of dial pulses thereto the number of the plurality being determined by the signal indications.

7. In a system as set forth in claim 1, the first means including means for storing signal manifestations of dial pulses, the system further including means (a) for changing the stored signal manifestations in response to input signals, and means (b) for receiving such input signals.

8. In a system as set forth in claim 7, the means (b) connected to one of the lines to receive the input signals through one of the lines.

9. In a system for telephone communication, the combination comprising:

first means at a first location for connection to two subscriber lines for directly interconnecting the two lines in response to a call coming in through one line;

second means connected to one of the lines in response to a call coming in through that one line for receiving signals having a particular characteristic and coming in through that one line during the call;

third means responsive to the particular characteristic of the signals thus received to provide a sequence of dial-out pulses corresponding to said signals to leave the first means through one of the lines;

means responsive to completion of providing of dial-out pulses to obtain an interconnection of the two lines.

10. In a system as set forth in claim 9, the second means including temporary storage means for representation of the signals, the third means operating in response to a call made to one line subsequent to the call during which the signals were received by the second means.

11. In a system as set forth in claim 9, the third means operating in immediate response to the signals as received by the second means to send the dial pulses through the respective other line.

12. In a system as in claim 9, including a transmitter for transmission audio signals of particular frequency for operation at a second location from which communication with the first means at the first location has been established through regular telephone line communication, the transmitter providing a particular sequence of audio signals for transmission to a telephone receiver at the second location, the transmitter operating in response to telephone number digits set into the transmitter, the third means including means responsive to the particular audio signals as received through the one line.

13. In a system as in claim 9, the third means responsive to particular signal components arriving through the one line, such components resulting from continued dialing at a second location after regular telephone communication has been established between a phone at the second location and the one line.

14. An automatic telephone switching system for connection to two telephone lines of a subscriber leading to a central exchange and for switching calls coming in through a first one of the lines as outgoing call of the second one of the lines comprising:

memory means for holding manifestations representing telephone number digits;

first means connected to respond to ringing signals in one line to initiate sequential readout of the content of the memory means as to the manifestations representing the several digits;

second means providing a source of timing signals represented by accurately spaced alternating dial pulses and dial pulse pauses;

third means for coupling the second means to the second line to provide dial pulses thereto corresponding to the manifestations as read from memory, separately for each digit so represented;

fourth means connected to interconnect the two lines subsequent to completion of the memory readout;

fifth means connected to the second one of the lines to be responsive to calls coming in through the second one of the lines to establish a memory loading state for the memory means;

sixth means connected to the second one of the lines for being responsive to a particular characteristic of signals arriving through the second one of the lines and processing the particular signals to obtain a new number to be stored in said memory means; and seventh means connected to the sixth means for storing manifestations of the new number in lieu of the number digits held therein prior to response of the fifth means.

15. A system as in claim 14, the third means including a register to stepwise receive the content of the memory, digit for digit, as represented by the manifestations;

the second means including a source of accurately spaced timing signals represented by alternating dial pulses and dial-pulse-pause for modifying the content of the register after each reading step until a particular count state in the register has been reached.

16. In a system as in claim 14, the sixth means being responsive to incoming signals of particular frequency and interpreting them as dialed-in digits to be processed by the second means for storage by the memory means to serve for dial-out operation.

17. In a system as in claim 16, the sixth means being responsive to pulse modulated carriers, demodulating same and providing pulses in representation of dial-in pulses.

18. In a system as in claim 16, the sixth means being responsive to frequency encoded signals and demodulating same to provide signals in representation of dial-in signals, to signals to have format for being stored in the memory means by operation of the seventh means.

19. In a system as in claim 14, the sixth means being responsive to incoming signals of particular amplitude interpreting them as dial pulses and producing dial pulse signals to be processed by the seventh means.

20. An automatic telephone switching system for connection to two telephone lines of a subscriber leading to a central exchange, and for switching calls coming in through a first one of the lines as outgoing call of the second one of the lines comprising:

a ring detector connected to the first one of the lines for detecting ringing signals in the first line and providing an output in response thereto;

timing means operated in response to a first ringing signal to provide a delayed control signal of a duration extending over a plurality of ringing signals;

first circuit means for closing the circuit on the second line;

second circuit means including manual selector means setting a mode of operation and connected for operating the first circuit means to obtain closing of the circuit on the second line either in response to the first output of the ring detector or after the delay of the timing means has elapsed;

third circuit means responsive to operation of the first circuit means subsequent to the delay imposed by virtue of the position of the selector means, to change the mode of operation of the second circuit means to cause the first circuit means to close on the first ringing signals of a later call;

means for feeding dial pulses into the second line subsequent to closing by the first circuit means; and means for connecting the first line to the second line subsequent to completion of feeding dial pulses into the second line.

21. A system as set forth in claim 20, including a switch operated in response to the first ring signal, the timing means turning the switch off after the timing has run, and means for causing the system to respond to ringing independently from the timing means subsequent to said turn-off.

22. In an automatic telephone switching system for connection to two telephone lines of a subscriber leading to a central exchange and for switching calls coming in through a first one of the lines as outgoing call of the second one of the lines as in claim 1, the ring detection comprising:

first means coupled to the first line and at floating potential relative to ground, to provide an output pulse of essentially constant amplitude in response to each signal excursion in the line exceeding a particular amplitude;

second means coupled to the first means and responsive to the output pulses, to integrate the output pulses and having a small time constant of decay so that a dial pulse sequence with dial pulses following each other at a rate of about 10 cps is insufficient to cause the integration output of the second means to reach a particular value; and third means connected to the second means and being responsive to the integrator output and providing a first signal when the integrator output is above the particular value and a second signal when the integrator output is below the particular value.

23. In a system as set forth in claim 22, the first means including gaseous bulb connected directly to the first line to provide radiant output when the instantaneous signal amplitude exceeds a particular value;

the first means further including a radiation detector positioned in relation to the bulb to receive the radiation;

the second means including electrical storage means connected to the radiation detector, there being biasing means to cause the storage means to accumulate electric energy when the detector receives a radiant output, there being discharge means to cause the storage means to loose energy when the detector does not receive a radiant output.

24. In a telephone call switching system for connection to two telephone lines of a subscriber leading to a central exchange and for switching calls coming in through a first one of the lines as outgoing call of the second one of the lines, the subscriber facility being at a first location, the combination comprising:

the facility at the first location, including memory means for holding manifestations representing telephone number digits of a particular telephone number;

first means connected to respond to ringing signals in one line to initiate sequential readout of the content of the memory means as to the manifestations representing the several digits;

second means providing a source of timing signals represented by accurately spaced alternating dial pulses and dial pulse pauses;

third means for coupling the second means to the second line, to provide dial pulses thereto, corresponding to the manifestations as read from memory, separately for each digit so represented;

fourth means connected to interconnect the two lines subsequent to completion of the memory readout;

means (a) at a second location having telephone lines connected to the central exchange and receiving calls made under the particular number, the means (a) for providing a particular signal to the first location in response to an incoming call as resulting from the dial-out of the particular number at the first location, the particular signal passing via the communication link from the line at the second location to the second line at the first location;

fifths means at the first location responsive to the particular signal for transmitting a particular identification code held in the memory means to the second location via the communication link between the second line and the line at the second location;

means (b) at the second location decoding the identification code and providing an indication representative of the subscriber; and sixth means at the first location and connected to the fourth means for obtaining interconnection of the two lines at the first location, after transmission of the ID code, thereby establishing a communication link through the fourth means as between the caller on the first line and the line at the second location.

25. In a system as set forth in claim 24, the second circuit means and the fifths means operating the memory means from which in a first phase the manifestation representing the particular number is read out and from which in a second phase the identification code is read out.

26. In a system as set forth in claim 25, the memory means having individually addressable storage locations;

the system further including, at the first location, a phase and memory address counter for controlling addressing of the memory, further including and control means for advancing the phase and address counter to alternate between stepwise advance for sequential readout and waiting phases during which signals of particular frequency including the particular signal are to be received at the first location prior to causing the phase counter to advance to the next number associated again with a memory location to be read.

27. In a system as set forth in claim 26, the signals of particular frequency including dial tone frequency to be received prior to transmitting the identification code the fifth means being also responsive to dial tone reception during interconnection as provided by the fourth means under control of the sixth means, and controlling opening the interconnection for termination of communication.

28. A system as in claim 24, there being means at the first location including manually operable means to operate the first means independently from the detection of ringing signals.

29. In a system as in claim 31, including additional means at the first location connected to the third means and including manually operable means to selectively obtain operation of the third means independently from the ring detector means.

30. In a telephone communication facility wherein a telephone call from a first subscriber line is switched as outgoing call through a second subscriber line by connecting the first and second lines, the improvement comprising:

first circuit means connected to monitor the signal level in the interconnected first and second lines and including a signal envelope detector providing a first output if the envelope is above a particular level for a particular minimum period of time;

a first timing circuit connected to be responsive to the providing of the first output and providing a second output if the first output is provided uninterruptedly for a particular period of time considerably longer than the minimum period;

a second timing circuit connected to be reset by the first output and providing a sampling signal if not reset for a second particular period of time, considerably longer than the minimum period;

second circuit means responsive to the sampling signal to briefly interrupt and reclose thereafter the connection between the first and second line; and circuit means for opening the connection between the first and second line for indefinite duration in response to a second output as provided by the first timing circuit, such second output being provided if a dial tone is on one of the lines after the brief interruption of connection by operation of the second circuit means.

31. An automatic telephone switching system for connection to two telephone lines of a subscriber leading to a central exchange and for switching calls coming in through a first one of the lines as outgoing call of the second one of the lines comprising:

memory means for holding manifestations representing telephone number digits; the memory being organized in individually addressable storage locations each holding manifestations of a digit of the number to be dialed out, the system including memory control means for sequentially addressing the locations for the several digits;

first means connected to respond to ringing signals in one line to initiate sequential addressing of the locations by the memory control means for sequential readout of the content of the locations of the memory means as to the manifestations in the locations representing the several digits;

second means providing a source of timing signals represented by accurately spaced alternating dial pulses and dial pulse pauses;

third means for coupling the second means to the second line to provide dial pulses thereto corresponding to the manifestations as read from memory, separately for each digit so represented;

the third means, including (a) counter means receiving the content of a storage location as addressed (b) first control means for operating the counter means in synchronism with the timing signals as provided by the second means thereby changing the number previously set into the counter means to a particular number, (c) second control means for coupling the second means to the second line for the duration of counting until the counter means has reached the particular number, and (d) third control means for operating the means for addressing subsequent to the counter means reaching the particular number, to obtain read-out of the content the memory location holding the manifestations representing the next digit, the counter means receiving these manifestations; and fourth means connected to interconnect the two lines subsequent to completion of the memory readout.

32. A system as set forth in claim 31, including means for receiving dial pulses through one of the lines in sequences, each sequence representing a telephone number digit;

sixth means for assembling the pulses of each sequence and processing same to provide manifestations of a number to be stored;

seventh means for loading the number to be stored into the memory means; and eighth means responsive to completion of a sequence of dial pulses as received to control the memory means for access to individual number locations in the memory means.

33. A system as set forth in claim 31, including sixth means connected to be responsive to completion of memory readout of manifestations representing the number to be dialed out on one line for monitoring reception of a particular signal through the other line;

seventh means connected to be responsive to reception of the particular signal when received through the other line, to operate the memory control means to continue readout of the memory means, the second and third means providing dial pulses as identification pulses into the other line, the fourth means operating subsequently to completion of sending out the identification pulses.

34. In system as set forth in claim 31, the memory means being a hard-wired, manually adjustable storage facility.

35. In a system as set forth in claim 31, the memory means including a plurality of storage cells provided for recording bivalued bits by operation of electrical signals.

36. In a system as set forth in claim 31, the first control means operating the counter means for continuing counting from the particular number in the counter means to a second number, prior to operation of the third control means as counter means in accordance with the next memory reading step, and fourth control means connected for inhibiting the second control means during counting from the particular number to the second number for metering a dial pulse sequence pause.

* * * * *